United States Patent
Boies et al.

(10) Patent No.: US 12,503,366 B2
(45) Date of Patent: Dec. 23, 2025

(54) METHOD FOR THE PREPARATION OF SINGLE-WALLED CARBON NANOTUBES

(71) Applicant: CAMBRIDGE ENTERPRISE LIMITED, Cambridge (GB)

(72) Inventors: Adam Boies, Cambridge (GB); Brian Mackenzie Graves, Cambridge (GB); Xiao Zhang, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 539 days.

(21) Appl. No.: 17/779,488

(22) PCT Filed: Nov. 25, 2020

(86) PCT No.: PCT/GB2020/052997
§ 371 (c)(1),
(2) Date: May 24, 2022

(87) PCT Pub. No.: WO2021/111106
PCT Pub. Date: Jun. 10, 2021

(65) Prior Publication Data
US 2023/0026255 A1    Jan. 26, 2023

(30) Foreign Application Priority Data
Dec. 3, 2019 (GB) .................................. 1917638

(51) Int. Cl.
C01B 32/162 (2017.01)
(52) U.S. Cl.
CPC ........ C01B 32/162 (2017.08); *C01B 2202/02* (2013.01)

(58) Field of Classification Search
CPC . C01B 32/162; C01B 2202/02; C01B 32/159; C01B 32/158; C01B 32/16; C01B 32/164; C01B 32/166; C01B 32/168; C01B 32/17; C01B 32/172; C01B 32/174; C01B 32/176; C01B 32/178; C01B 2202/00; C01B 2202/04; C01B 2202/06;
(Continued)

(56) References Cited
U.S. PATENT DOCUMENTS

2007/0148962 A1* 6/2007 Kauppinen ........... C01B 32/174
                                                                438/689
2010/0075137 A1   3/2010 Sinton et al.
(Continued)

FOREIGN PATENT DOCUMENTS

CN   105836726 A    8/2016
JP   2007-527844   10/2007
(Continued)

OTHER PUBLICATIONS

Zhang, et al., Arrays of horizontal carbon nanotubes of controlled chirality grown using designed catalysts, Nature 2017; 543: 234-238 (Year: 2017).*

(Continued)

*Primary Examiner* — Daniel C. McCracken
(74) *Attorney, Agent, or Firm* — Foley & Lardner LLP

(57) ABSTRACT

The present invention relates to the production of a carbon material (eg a carbon nanomaterial) comprising single-walled carbon nanotubes (SWCNTs) and to the carbon material per se.

11 Claims, 22 Drawing Sheets

(58) Field of Classification Search
CPC ............ C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 13/0095; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

U.S. PATENT DOCUMENTS

| | | | |
|---|---|---|---|
| 2011/0165058 A1* | 7/2011 | Sankaran | ................ C01B 32/16 977/843 |
| 2014/0348721 A1 | 11/2014 | Kauppinen et al. | |

FOREIGN PATENT DOCUMENTS

| | | |
|---|---|---|
| KR | 1020110097431 A | 8/2011 |
| WO | WO-2013/162650 A1 | 10/2013 |

OTHER PUBLICATIONS

Moisala, et al., On-line detection of single-walled carbon nanotube formation during aerosol synthesis methods, Carbon 2005; 43: 2066-2074 (Year: 2005).*

Kim, et al., In-Flight Kinetic Measuremetns of the Aerosol Growth of Carbon Nanotubes by Electrical Mobility Classification, J. Phys. Chem B 2006; 110: 4555-4562 (Year: 2006).*

Ahmad, et al., Systematic investigation of the catalyst composition effects on single-walled carbon nanotubes synthesis in floating-catalyst CVD, Carbon 2019: 318-327 (Year: 2019).*

Bronikowski, Use of refractory-metal diffusion inhibitors to slow Ostwald ripening of catalytic metal particles: A route to ultra-long Carbon Nanotubes, Carbon 2016; 107: 297-303 (Year: 2016).*

Ritschel, et al., Rhenium-Catalyzed Growth Carbon Nanotubes, J. Phys. Chem. C 2007; 111: 8414-8417 (Year: 2007).*

Great Britain Intellectual Property Office Search Report on application GB1917638.7 dated Jun. 2, 2020 (5 pages).

International Preliminary Report on Patentability on PCT Appl. Ser. No. PCT/GB2020/052997 dated Jun. 16, 2022 (11 pages).

International Search Report and Written Opinion in international application No. PCT/GB2020/052997 dated Feb. 22, 2021. (15 pages).

Chiang Wei-Hung et al: "Microplasma synthesis of metal nanoparticles for gas-phase studies of catalyzed carbon nanotube growth", Applied Physics Letters, A I P Publishing LLC, US, vol. 91, No. 12, Sep. 20, 2007 (Sep. 20, 2007), pp. 121503-121503, XP012099242, ISSN: 0003-6951, DOI: 10.1063/1.2786835.

Examination Report dated Mar. 26, 2024 on EP Application 20 819 832.5-1108 (9 pages).

Second Office Action dated May 13, 2024 for CN Application 202080084066.7 (35 pages w/English translation).

First Office Action on CN App. 202080084066.7 dated Aug. 24, 2023 (23 pages).

Chiang, et al., "Linking catalyst composition to chirality distributions of as-grown single-walled carbon nanotubes by tuning NixFe1-x nanoparticles", Nature Materials 8, pp. 882-886 (2009).

Chiang, et al., "Supplementary Information—Linking catalyst composition to chirality distributions of as-grown single-walled carbon nanotubes by tuning NixFe1-x nanoparticles", Nature Materials 8, pp. 1-20 (2009).

Kim & Zachariah, "In-Flight Kinetic Measurements of the Aerosol Growth of Carbon Nanotubes by Electrical Mobility Classification", Journal of Physical Chemistry Part B 110(10), pp. 4555-4555 (2006).

Lee, et al., "Carbon nanotubes produced by tungsten-based catalyst using vapor phase deposition method," Chemical Physics Letters 361(5-6), pp. 469-472 (2002).

Ritschel, et al., "Rhenium-Catalyzed Growth Carbon Nanotubes," Journal of Physical Chemistry 111(24), pp. 8414-8417 (2007).

Sato, et al., "Growth of diameter-controlled carbon nanotubes using monodisperse nickel nanoparticles obtained with a differential mobility analyzer," Chemical Physics Letters 382(3-4), pp. 361-366 (2003).

Zhang, et al., "Arrays of horizontal carbon nanotubes of controlled chirality grown using designed catalysts," Nature 543, pp. 234-238 (15 pages total with Extended Data) (2017).

Office Action dated Nov. 26, 2024, received in Japanese Patent Application No. 2022-529109.

* cited by examiner

METHOD FOR THE PREPARATION OF SINGLE-WALLED CARBON NANOTUBES

CROSS-REFERENCE TO RELATED APPLICATIONS

This application claims the benefit of priority to PCT International Application No. PCT/GB2020/052997, filed on Nov. 25, 2020, which claims the benefit of Great Britain Patent Application No. 1917638.7, filed Dec. 3, 2019, which is hereby incorporated by reference in its entirety.

The present invention relates to the production of a carbon material (eg a carbon nanomaterial) comprising single-walled carbon nanotubes (SWCNTs) and to the carbon material per se.

The potential for SWCNTs to fulfil their promise in next generation transistors and sensors has been hindered by the lack of control over their chirality. Although control of chirality has been achieved on the laboratory scale by wet selective purification, this inevitably damages the pristine SWCNTs. For this reason, direct chemical vapour deposition (CVD) is the preferred method of production. However even after decades of research, direct growth of SWCNTs with narrow chirality distribution remains challenging.

During CVD, it is widely accepted that the structure and morphology of the catalyst particles have deterministic roles on the characteristics of the CNTs. For example, Ostwald ripening and flexible morphology of traditional liquid state catalysts (such as iron, cobalt and nickel) mean that direct control of chirality has remained unattainable. Alternatively catalysts that persist in a solid-state during growth maintain hope for the realization of in-situ chirality control. It has been suggested that the higher energy barrier of solid catalysts towards incorporating new carbon atoms could be exploited as a control method (see Artyukhov, V. I., Penev, E. S. & Yakobson, B. I. *Why nanotubes grow chiral*. Nat. Commun. 5, 4892, doi:10.1038/ncomms5892).

A method to generate small, precisely controlled nanoparticles on a large scale is another long-sought after goal. Due to the correlation between the SWCNT diameter and the catalyst diameter, the control of chirality can be directly linked to facile production of solid catalysts with narrow size distributions. Recent methods for producing solid catalysts used either molecular clusters with fixed metallic ratios (see Yang, F. et al. *Chirality-specific growth of single-walled carbon nanotubes on solid alloy catalysts*. Nature 510, 522, doi:10.1038/nature13434) or special substrate reaction limitation (see Zhang, S. et al. *Arrays of horizontal carbon nanotubes of controlled chirality grown using designed catalysts*. Nature advance online publication, doi:10.1038/nature21051). A scaled-up method without restriction on substrate would benefit enormously the industrialization of chirality controlled SWCNT production.

The present invention seeks to improve the continuous or semi-continuous production of single-walled carbon nanotubes (SWCNTs) by using high melting point metal nanoparticles prepared in near monodisperse sizes from a continuous gas phase (aerosol) process. In particular, the monodispersed metal nanoparticles can be fed into a reactor or deposited onto a substrate and used to grow successfully random or aligned SWCNTs with narrowly controlled chirality.

Thus viewed from a first aspect the present invention provides a method for the production of a carbon material comprising SWCNTs, wherein the method comprises:

(a) producing a flow of a refractory metal material suspended in a carrier gas;

(b) introducing the flow of the refractory metal material into a temperature-controlled flow-through furnace;

(c) subjecting the flow of the refractory metal material to a temperature sufficient to generate a flow of a refractory metal substance, wherein the flow of the refractory metal substance is exposed to a first temperature zone sufficient to evaporate the refractory metal substance and to a second temperature zone downstream from the first temperature zone, wherein the second temperature zone is sufficient to re-nucleate the refractory metal substance to generate a flow of a nanoparticulate refractory metal substance;

(d) isolating from the flow of the nanoparticulate refractory metal substance a discrete flow of the nanoparticulate refractory metal substance which exhibits a selected distribution of nanoparticle size;

(e) introducing the discrete flow of the nanoparticulate refractory metal substance into a temperature-controlled reactor;

(f) optionally releasing a flow of a reducing agent into the temperature-controlled reactor, wherein the flow of the reducing agent and the discrete flow of the nanoparticulate refractory metal substance are exposed to a third temperature zone sufficient to generate a flow of a nanoparticulate refractory metal;

(g) releasing a flow of a source of carbon into the temperature-controlled reactor; and (h) exposing the nanoparticulate refractory metal and the source of carbon to a fourth temperature zone sufficient to produce the carbon material comprising SWCNTs which is adaptable into a supported or self-supporting form in or collectable from the temperature-controlled reactor.

The (or each) flow may be an aerosol flow.

The refractory metal material may be suspended in the carrier gas as solid particles (preferably solid nanoparticles). The refractory metal material may be formed into a powder dispersion.

The refractory metal material may be a refractory metal element (eg a refractory metal element powder) or a refractory metal compound.

The refractory metal compound may be a refractory metal complex, salt or organometallic.

The carrier gas is typically one or more of nitrogen, argon, helium or hydrogen. Preferably the carrier gas is nitrogen.

Preferably step (a) comprises:

(a') atomising a liquid formulation of the refractory metal compound.

The liquid formulation may be a slurry. The liquid formulation may be an aqueous formulation. The liquid formulation may be a solution, dispersion or suspension. Step (a') may be carried out in a nebulizer.

In a preferred embodiment, the liquid formulation of the refractory metal compound is a refractory metal salt solution. Particularly preferably, the refractory metal salt solution is very dilute. The use of a very dilute refractory metal salt solution permits facile and accurate control of the particle size of the nanoparticulate refractory metal substance which is discharged from the temperature-controlled flow-through furnace.

The concentration of the refractory metal salt solution may be 1.0 mM or less (with respect to the metal atoms), preferably 0.7 mM or less, particularly preferably 0.3 mM or less.

Preferably step (a) further comprises:

(a") drying the flow of the refractory metal compound.

Step (a") may be carried out by a desiccant dryer.

Steps (a') and (a") may be carried out together by spray drying.

Step (a) may be carried out using a hot wire.

Preferably step (a) comprises:
(a1) dispersing a flow of a refactor metal material in a carrier gas.

Step (a1) may be carried out in a fluidised bed feeder, jet mill or positive displacement-style feeder.

The refractory metal substance may be a refractory metal element.

Preferably the refractory metal substance is a refractory metal oxide.

Preferably step (f) is releasing a flow of a reducing agent into the temperature-controlled reactor, wherein the flow of the reducing agent and the discrete flow of the nanoparticulate refractory metal substance are exposed to a third temperature zone sufficient to generate a flow of a nanoparticulate refractory metal.

The reducing agent may be hydrogen.

The carbon material may comprise multi-walled carbon nanotubes (eg double-walled carbon nanotubes). Typically the carbon material is predominantly SWCNTs. The SWCNTs may be high purity SWCNTs. The number of SWCNTs amongst the carbon nanotubes is typically >50%. Preferably the number of SWCNTs amongst the carbon nanotube structures is >80%, particularly preferably >90%, more preferably >95 wt %.

Preferably in the carbon material comprising SWCNTs, one or more pairs of chiral indices selected from the group consisting of (2n±2, n), (2n±1, n) and (2n, n) is exhibited by a majority of the SWCNTs. Particularly preferably in the carbon material comprising SWCNTs, the pair of chiral indices exhibited by a majority of the SWCNTs is (2n, n).

Typically the pair of chiral indices is as determined by Raman spectroscopy carried out on the carbon material in the radial breathing mode region.

Preferably n is an integer in the range 4 to 7, particularly preferably in the range 5 to 7.

The pair of chiral indices may be (12, 6), (10, 5), (8, 4), (12, 5) or (9, 4).

Preferably the pair of chiral indices is (12, 6) and/or (10, 5).

Preferably the pair of chiral indices is (12, 6).

Preferably the one or more pairs of chiral indices selected from the group consisting of (2n±2, n), (2n±1, n) and (2n, n) is exhibited by 50 wt % or more of the SWCNTs, particularly preferably 60 wt % or more of the SWCNTs, more preferably 75 wt % or more of the SWCNTs, yet more preferably 85 wt % or more of the SWCNTs, especially preferably 90 wt % or more of the SWCNTs.

Preferably in the carbon material comprising SWCNTs, a chirality angle in the range 12 to 260 (preferably 13 to 24°, particularly preferably 16 to 22°, more preferably 17 to 21°, yet more preferably 18 to 20°) is exhibited by a majority of the SWCNTs.

Preferably a chirality angle in the range 12 to 26° is exhibited by 50 wt % or more of the SWCNTs, particularly preferably 60 wt % or more of the SWCNTs, more preferably 75 wt % or more of the SWCNTs, yet more preferably 85 wt % or more of the SWCNTs, especially preferably 90 wt % or more of the SWCNTs.

Preferably in the carbon material comprising SWCNTs, the average chirality angle of the SWCNTs is in the range 18 to 20°.

The refractory metal may have a melting point in excess of 2500° C.

The refractory metal may be one or more of the group consisting of W, Mo, Re, V, Nb, Ir, Ru, Os and Rh.

Preferably the refractory metal is W, Mo or Re. Particularly preferably the refractory metal is W.

Particularly preferably the refractory metal is Mo. Particularly preferably the refractory metal is Re.

In step (h), the nanoparticulate refractory metal may act as a catalyst in its elemental form.

Alternatively the nanoparticulate refractory metal may react with carbon to form a nanoparticulate refractory metal carbide which acts as a catalyst.

The first temperature zone may be at 250° C. or more, preferably 500° C. or more, particularly preferably 950° C. or more.

The second temperature zone may be at a temperature which is lower than the temperature of the first temperature zone. The second temperature zone may be in or downstream from the temperature-controlled flow-through furnace. The second temperature zone may be a cooling zone.

The third temperature zone may be at 200° C. or more.

The fourth temperature zone may be at 500° C. or more, preferably 700° C. or more.

Preferably step (d) is carried out by classifying the nanoparticles of the nanoparticulate refractory metal substance according to their mass, aerodynamic diameter or electrical mobility.

Step (d) may be carried out by a particle size classifier (eg an aerosol classifier). The classifier may be a differential mobility analyser, aerodynamic aerosol classifier or centrifugal particle mass analyser.

The geometric mean diameter GMD (eg mobility diameter) of the nanoparticulate refractory metal substance in the discrete flow of the nanoparticulate refractory metal substance may be 10 nm or less, preferably 7 nm or less, particularly preferably 3 nm or less. The geometric mean diameter (GMD) of the nanoparticulate refractory metal substance in the discrete flow of the nanoparticulate refractory metal substance may be in the range 1 to 5 nm.

The number concentration of the nanoparticulate refractory metal substance in the discrete flow of the nanoparticulate refractory metal substance may be $10^5$ cm$^{-3}$ or more, preferably $10^6$ cm$^{-3}$ or more, particularly preferably $10^7$ cm$^{-3}$ or more.

Preferably the nanoparticulate refractory metal substance in the discrete flow of the nanoparticulate refractory metal substance is substantially monodispersed. Preferably the geometric standard deviation (GSD) of the diameter (eg mobility diameter) of the nanoparticulate refractory metal substance is less than 2, particularly preferably less than 1.5, more preferably less than 1.1.

The geometric mean diameter (GMD) of the nanoparticulate refractory metal may be 8 nm or less, preferably 5 nm or less, particularly preferably 2 nm or less. The geometric mean diameter (GMD) of the nanoparticulate refractory metal may be in the range 1 to 5 nm.

Preferably the method further comprises:
(e') introducing a discrete flow of a second nanoparticulate refractory metal substance into the temperature-controlled reactor.

The discrete flow of the second nanoparticulate refractory metal substance may be prepared by subjecting a second refractory metal material to steps (a) to (d) either together with or separately from steps (a) to (d) carried out on the refractory metal material. For example, steps (a) to (d) may be carried out on a refractory metal compound and a second refractory metal compound together in a mixture or as an alloy or intermetallic.

The second refractory metal compound may be a W, Mo, Re V, Nb, Ir, Ru or Rh compound.

In the supported form, the carbon material comprising SWCNTs may be supported (eg deposited) on a substrate.

In the self-supporting form, the carbon material comprising SWCNTs may be a powder, fibre, film or mat.

The carbon material comprising SWCNTs may be collectable from the temperature-controlled reactor by displacing the carbon material comprising SWCNTs as a continuous discharge through a discharge outlet of the temperature-controlled flow-through reactor and collecting the continuous discharge. The carbon material comprising SWCNTs may be displaced by a mechanical, electrostatic or magnetic force. The continuous discharge may be collected mechanically. For example, the continuous discharge may be collected on a rotary spindle or drum.

The flow rate of the discrete flow of the nanoparticulate refractory metal substance in step (e) may be up to 50 g/hour (eg about 7 g/hour).

The nanoparticulate refractory metal substance may be introduced (eg injected) in step (e) in a linear, axial, vortical, helical, laminar or turbulent flow path. The nanoparticulate refractory metal substance may be introduced at a plurality of locations. In step (e), the nanoparticulate refractory metal substance may be introduced axially or radially into the temperature-controlled flow-through reactor (through a probe or injector).

Before step (g), the source of carbon may be heated. Before step (g), the source of carbon may be subjected to radiative heat transfer by a source of infrared, visible, ultraviolet, x-ray, radiofrequency or microwave energy.

In step (g) the source of carbon may be introduced (eg injected) in a linear, axial, vortical, helical, laminar or turbulent flow path.

In step (g), the source of carbon may be introduced axially or radially into the temperature-controlled flow-through reactor. The source of carbon may be introduced axially through a probe or injector. The source of carbon may be introduced at a plurality of locations.

The source of carbon may be an optionally substituted and/or optionally hydroxylated aromatic or aliphatic, acyclic or cyclic hydrocarbon (eg alkyne, alkane or alkene) which is optionally interrupted by one or more heteroatoms (eg oxygen). Preferred is an optionally halogenated $C_{1-6}$-hydrocarbon (eg methane, propane, ethylene, acetylene or tetrachloroethylene), an optionally mono-, di- or tri-substituted benzene derivative (eg toluene) or $C_{1-6}$-alcohol (eg ethanol).

Preferably the source of carbon is methane optionally (but preferably) in the presence of an optionally substituted and/or optionally hydroxylated aromatic or aliphatic, acyclic or cyclic hydrocarbon (eg alkyne, alkane or alkene) which is optionally interrupted by one or more heteroatoms (eg oxygen).

The source of carbon may be a $C_{1-6}$-hydrocarbon such as methane, ethylene or acetylene.

The source of carbon may be an alcohol such as ethanol or butanol.

The source of carbon may be an aromatic hydrocarbon such as benzene or toluene.

In a preferred embodiment, the source of carbon is methane optionally in the presence of propane or acetylene.

The flow rate of the source of carbon may be in the range 0.5 to 30000 sccm (eg 2000 sccm).

Typically in step (g), the source of carbon is introduced with a carrier gas such as helium, hydrogen, nitrogen or argon.

The temperature-controlled flow-through reactor and/or temperature-controlled flow through furnace may be cylindrical or another geometry. The temperature-controlled flow-through reactor and/or temperature-controlled flow through furnace may be substantially vertical or horizontal.

The walls of the temperature-controlled flow-through reactor and/or temperature-controlled flow through furnace may be selectively cooled by exposure to a cooling fluid such as water, liquid nitrogen or liquid helium.

The temperature-controlled flow-through reactor and/or temperature-controlled flow through furnace may be adapted to provide an axial temperature gradient. The axial temperature gradient may be non-uniform (eg stepped). The temperature of the temperature-controlled flow-through reactor and/or temperature-controlled flow through furnace may be controlled by resistive heating, plasma or laser. The temperature profile in the temperature-controlled flow-through reactor and/or temperature-controlled flow through furnace may be substantially parabolic.

The temperature-controlled flow-through reactor and/or temperature-controlled flow through furnace may be adapted to introduce reactants (for example by an injection nozzle, lance, probe or a multi-orificial injector (eg a shower head injector)).

Viewed from a further aspect the present invention provides an assembly for the production of a carbon material comprising SWCNTs, wherein the assembly comprises:
(A) an aerosolising device for producing an aerosol flow of a refractory metal material suspended in a carrier gas;
(B) a temperature-controlled flow-through furnace operatively connected to and downstream from the aerosolising device, wherein in use the temperature-controlled flow-through furnace receives the flow of the refractory metal material and discharges a flow of a nanoparticulate refractory metal substance;
(C) a particle size classifier operatively connected to and downstream from the temperature-controlled flow-through furnace, wherein in use the particle size classifier isolates a discrete flow of the nanoparticulate refractory metal substance according to a selected distribution of particle size; and
(D) a temperature-controlled reactor operatively connected to and downstream from the particle size classifier, wherein in use the temperature-controlled reactor receives the discrete flow of the nanoparticulate refractory metal substance, an optional flow of a reducing agent and a flow of a source of carbon whereby to produce the carbon material comprising SWCNTs.

In this aspect of the invention, the steps and features may be as hereinbefore defined for analogous steps and features.

Viewed from a yet further aspect the present invention provides a process for the production of a carbon material comprising SWCNTs, wherein the process comprises:
(1) producing a flow of a refractory metal material suspended in a carrier gas;
(2) introducing the flow of the refractory metal material into a temperature-controlled flow-through furnace;
(3) subjecting the flow of the refractory metal material to a temperature sufficient to generate a flow of a refractory metal substance, wherein the flow of the refractory metal substance is exposed to a first temperature zone sufficient to evaporate the refractory metal substance and to a second temperature zone downstream from the first temperature zone, wherein the second temperature zone is sufficient to re-nucleate the refractory metal substance to generate a flow of a nanoparticulate refractory metal substance;

(4) isolating from the flow of the nanoparticulate refractory metal substance a discrete flow of the nanoparticulate refractory metal substance which exhibits a selected distribution of nanoparticle size;

(5) exposing an optional reducing agent and the nanoparticulate refractory metal substance to a third temperature zone sufficient to generate a nanoparticulate refractory metal; and (6) exposing a source of carbon and the nanoparticulate refractory metal to a fourth temperature zone sufficient to produce the carbon material comprising SWCNTs, wherein the process further comprises either depositing the nanoparticulate refractory metal substance onto a substrate after step (4) or depositing the nanoparticulate refractory metal onto a substrate after step (5).

In this aspect of the invention, the steps and features may be as hereinbefore defined for analogous steps and features.

Viewed from a still yet further aspect the present invention provides an apparatus for the production of a carbon material comprising SWCNTs, wherein the apparatus comprises:

(A) an aerosolising device for producing an aerosol flow of a refractory metal material suspended in a carrier gas;

(B) a temperature-controlled flow-through furnace operatively connected to and downstream from the aerosolising device, wherein in use the temperature-controlled flow-through furnace receives the flow of the refractory metal material and discharges a flow of a nanoparticulate refractory metal substance;

(C) a particle size classifier operatively connected to and downstream from the temperature-controlled flow-through furnace, wherein in use the particle size classifier isolates a discrete flow of the nanoparticulate refractory metal substance according to a selected distribution of particle size;

(D) a first device for exposing an optional reducing agent and the nanoparticulate refractory metal substance to a temperature sufficient to generate a nanoparticulate refractory metal; and (E) a second device for exposing a source of carbon and the nanoparticulate refractory metal to a temperature sufficient to produce the carbon material comprising SWCNTs, wherein the apparatus further comprises: a precipitator which is either operatively connected to and downstream from the particle size classifier, wherein in use the precipitator deposits the nanoparticulate refractory metal substance onto a substrate or operatively connected to and downstream from the first device, wherein in use the precipitator deposits the nanoparticulate refractory metal onto a substrate.

In this aspect of the invention, the steps and features may be as hereinbefore defined for analogous steps and features.

In a preferred embodiment the precipitator is an electrostatic precipitator.

Viewed from an even yet still further aspect the present invention provides a carbon material comprising SWCNTs, wherein one or more pairs of chiral indices selected from the group consisting of $(2n\pm2, n)$, $(2n\pm1, n)$ and $(2n, n)$ is exhibited by a majority of the SWCNTs.

Typically the chiral indices are as determined by Raman spectroscopy carried out on the carbon material in the radial breathing mode region.

Preferably in the carbon material comprising SWCNTs, the pair of chiral indices exhibited by a majority of the SWCNTs is $(2n, n)$.

Preferably n is an integer in the range 4 to 7, particularly preferably in the range 5 to 7.

The pair of chiral indices may be (12, 6), (10, 5), (8, 4), (12, 5) or (9, 4).

Preferably the pair of chiral indices is (12, 6) and/or (10, 5).

Preferably the pair of chiral indices is (12, 6).

Preferably the one or more pairs of chiral indices selected from the group consisting of $(2n\pm2, n)$, $(2n\pm1, n)$ and $(2n, n)$ is exhibited by 50 wt % or more of the SWCNTs, particularly preferably 60 wt % or more of the SWCNTs, more preferably 75 wt % or more of the SWCNTs, yet more preferably 85 wt % or more of the SWCNTs, especially preferably 90 wt % or more of the SWCNTs.

Viewed from an even further aspect the present invention provides a carbon material comprising SWCNTs, wherein a chirality angle in the range 12 to 260 (preferably 13 to 24°, particularly preferably 16 to 22°, more preferably 17 to 21°, yet more preferably 18 to 20°) is exhibited by a majority of the SWCNTs.

Preferably a chirality angle in the range 12 to 26° is exhibited by 50 wt % or more of the SWCNTs, particularly preferably 60 wt % or more of the SWCNTs, more preferably 75 wt % or more of the SWCNTs, yet more preferably 85 wt % or more of the SWCNTs, especially preferably 90 wt % or more of the SWCNTs.

Viewed from a furthest aspect the present invention provides a carbon material comprising SWCNTs, wherein the average chirality angle of the SWCNTs is in the range 18 to 20°.

The present invention will now be described in a non-limitative sense with reference to the accompanying Figures in which:

FIG. 1 is a schematic illustration of aerosol production and size-selection setup for continuous nanoparticle generation and collection and accompanying plots of mobility-equivalent diameter taken at various stages of the method of the invention;

FIGS. 2a-c are AFM images of W oNPs homogenously deposited on $SiO_2$/Si substrates. Particle populations possessing narrow size distributions with various mean diameters are shown including (a) ~1.2 nm, (b) ~2.0 nm and (c) ~3.2 nm;

FIGS. 2d-e are HRTEM images of (d) polycrystalline Mo oNPs with a mobility-equivalent diameter of 10 nm corresponding to a diameter of ~7 nm measured by TEM and AFM and (e) single crystal Mo mNPs after reduction and reconstruction. The diameter of the mNPs is ~60% of the diameter of the oNPs;

FIG. 2f shows the evolution in the observed diameter of Mo NPs through stages of particle production and CNT growth for several mobility-equivalent diameters as prescribed using the DMA. The black arrows demonstrate the ~60% reduction in diameter between FIGS. 2d and e. During the growth stage, $Mo_2C$ retains the size of mNPs which strongly determines the diameter of the CNTs;

FIGS. 3a-b show SEM images of SWCNTs grown from (a) low areal density NPs and (b) high areal density NPs on a marked $SiO_2$/Si substrate;

FIG. 3c shows the XRD profile of W, Mo and Re catalysts during the growth stage (all nanoparticles were supported on alumina filters);

FIGS. 3d-e show TEM images of SWCNTs grown with (d) 2.4 nm Mo oNPs and (e) 4.3 nm W oNPs;

FIG. 3f shows a TEM image of SWCNTs grown with 6.7 nm Mo oNPs. Few walled CNTs were produced with more defects;

FIGS. 4a-c are Raman mapping results of SWCNTs grown from a W catalyst (oNP diameter ~2.5 nm, mNP diameter ~1.5 nm). Raman spectra in the RBM region were detected by (a) 532 nm, (b) 638 nm and (c) 785 nm lasers with all baselines subtracted;

FIGS. 4d to f are the mass abundance statistics from the 532, 638 and 785 nm laser respectively with a normalized scale;

Figure 2:
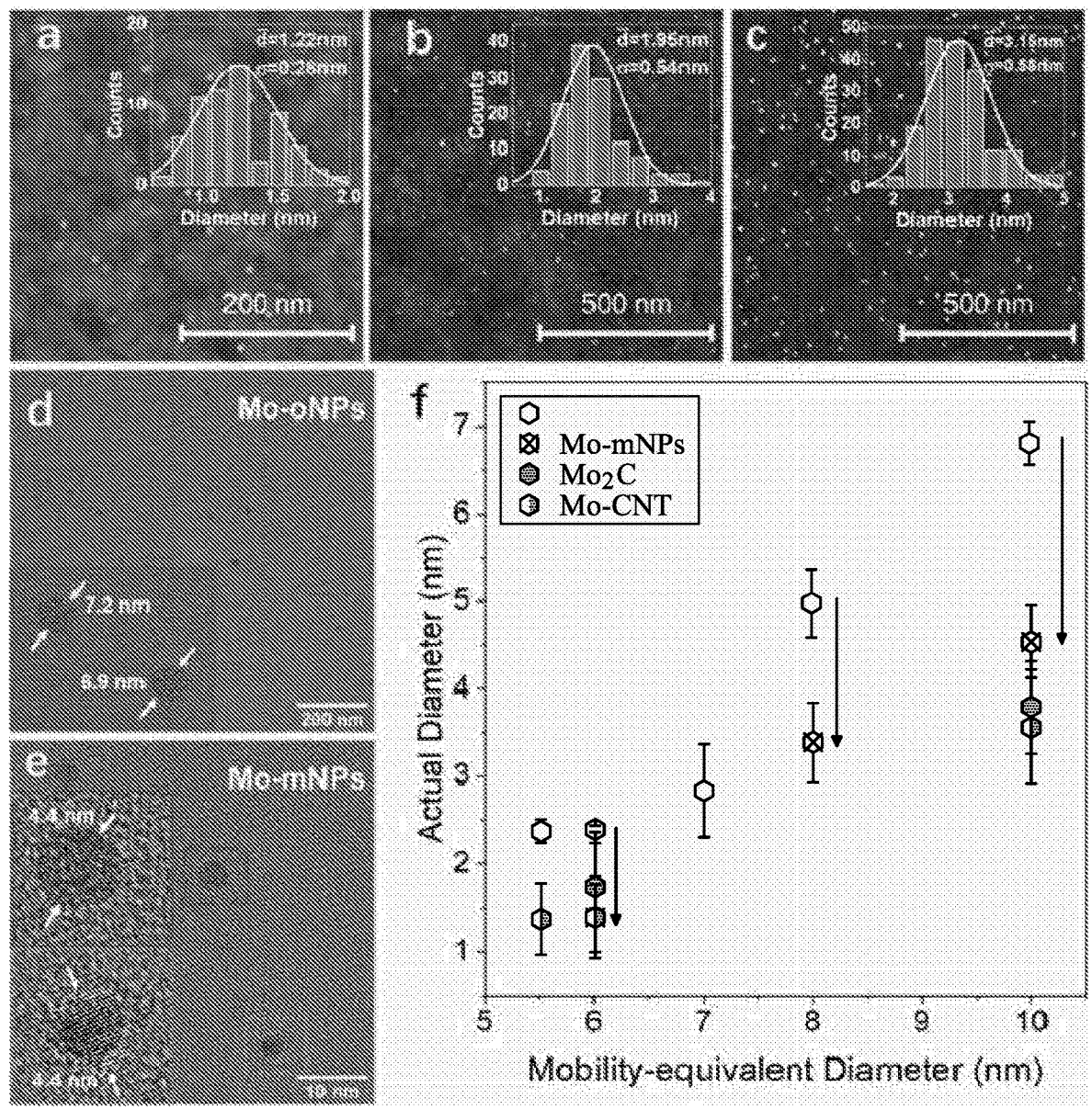
Figure 9:
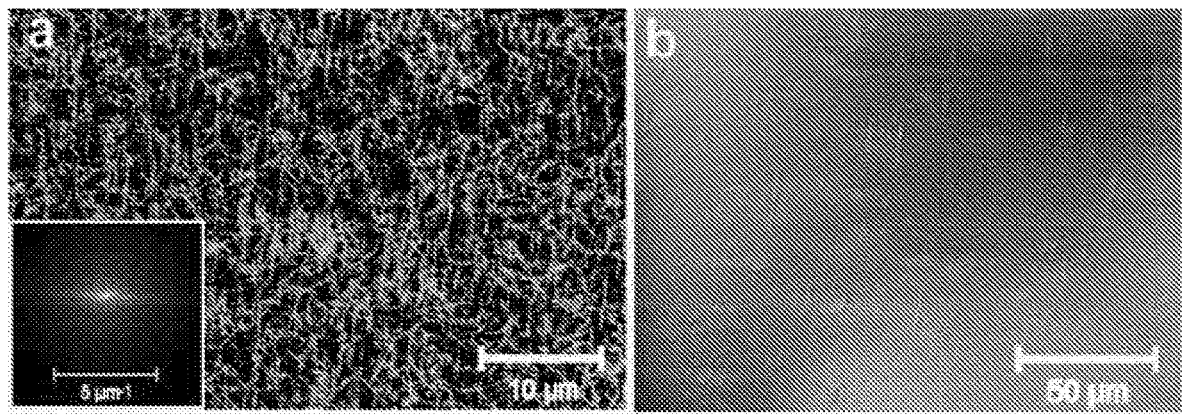
Figure 10:
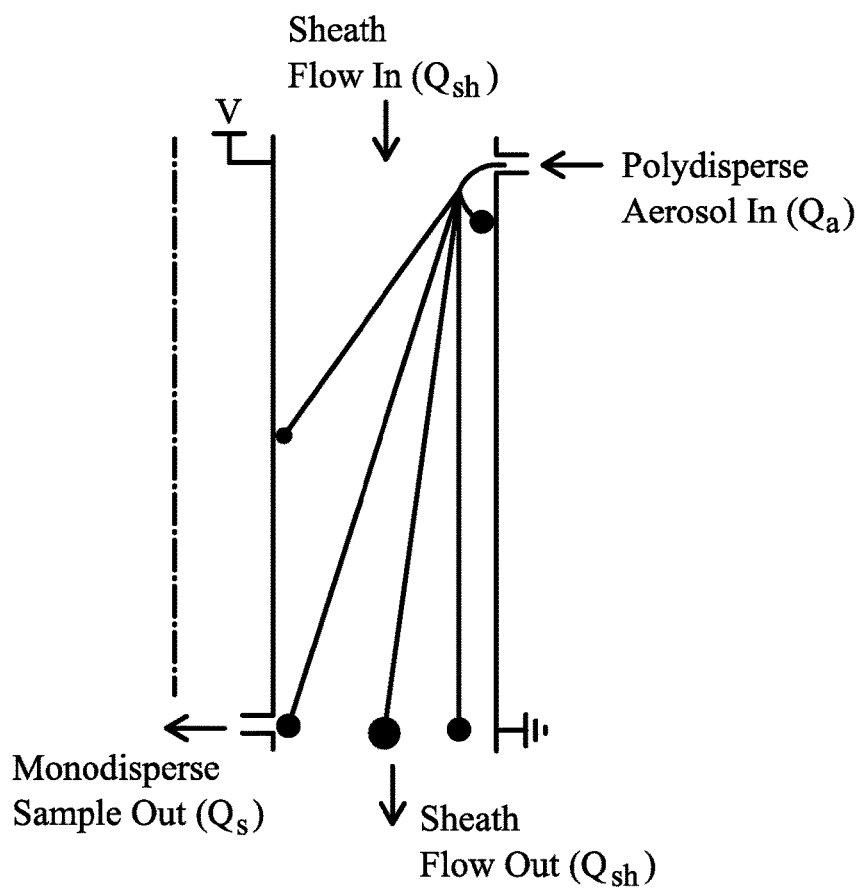
Figure 11:
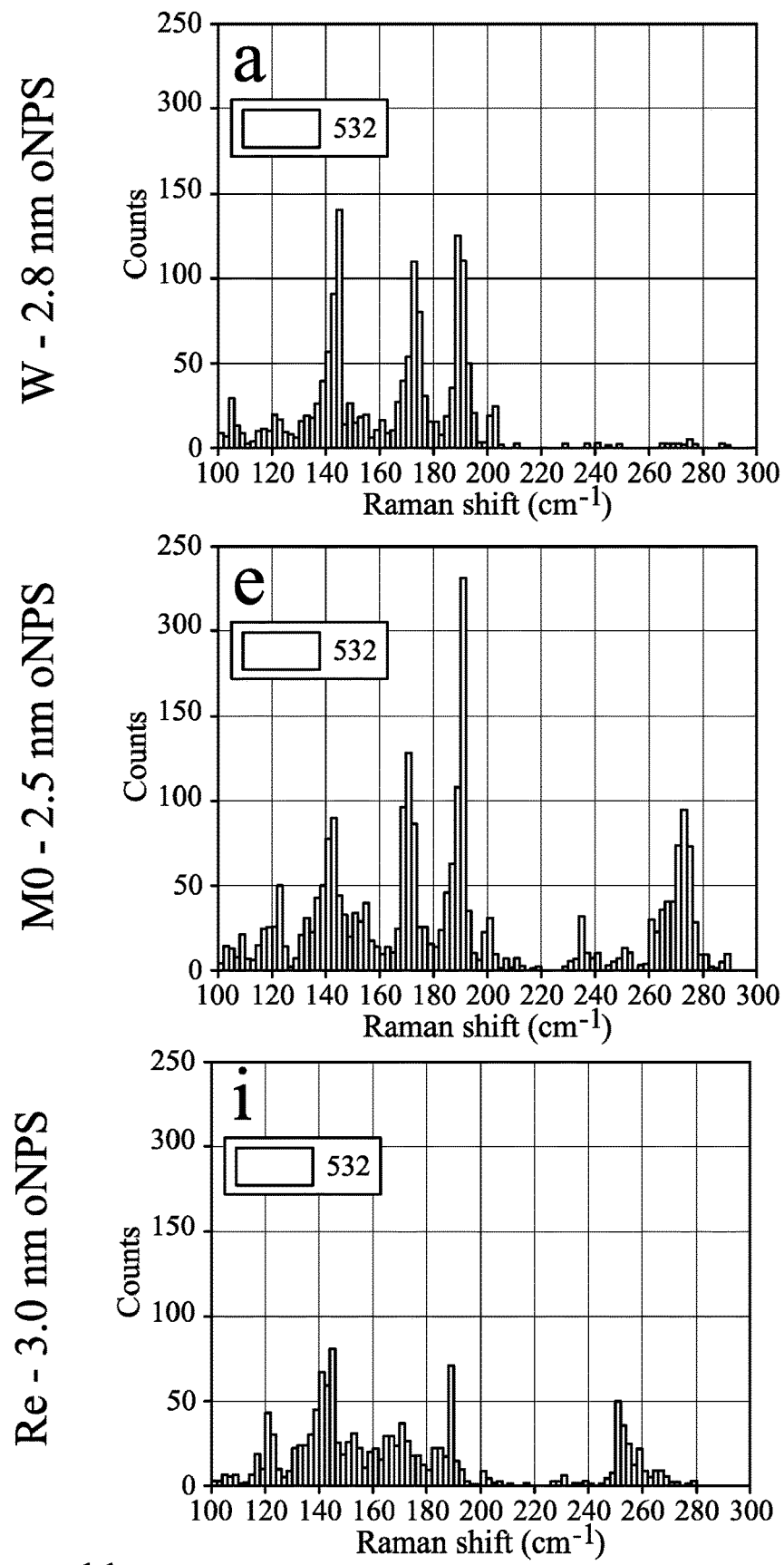
Figure 11:
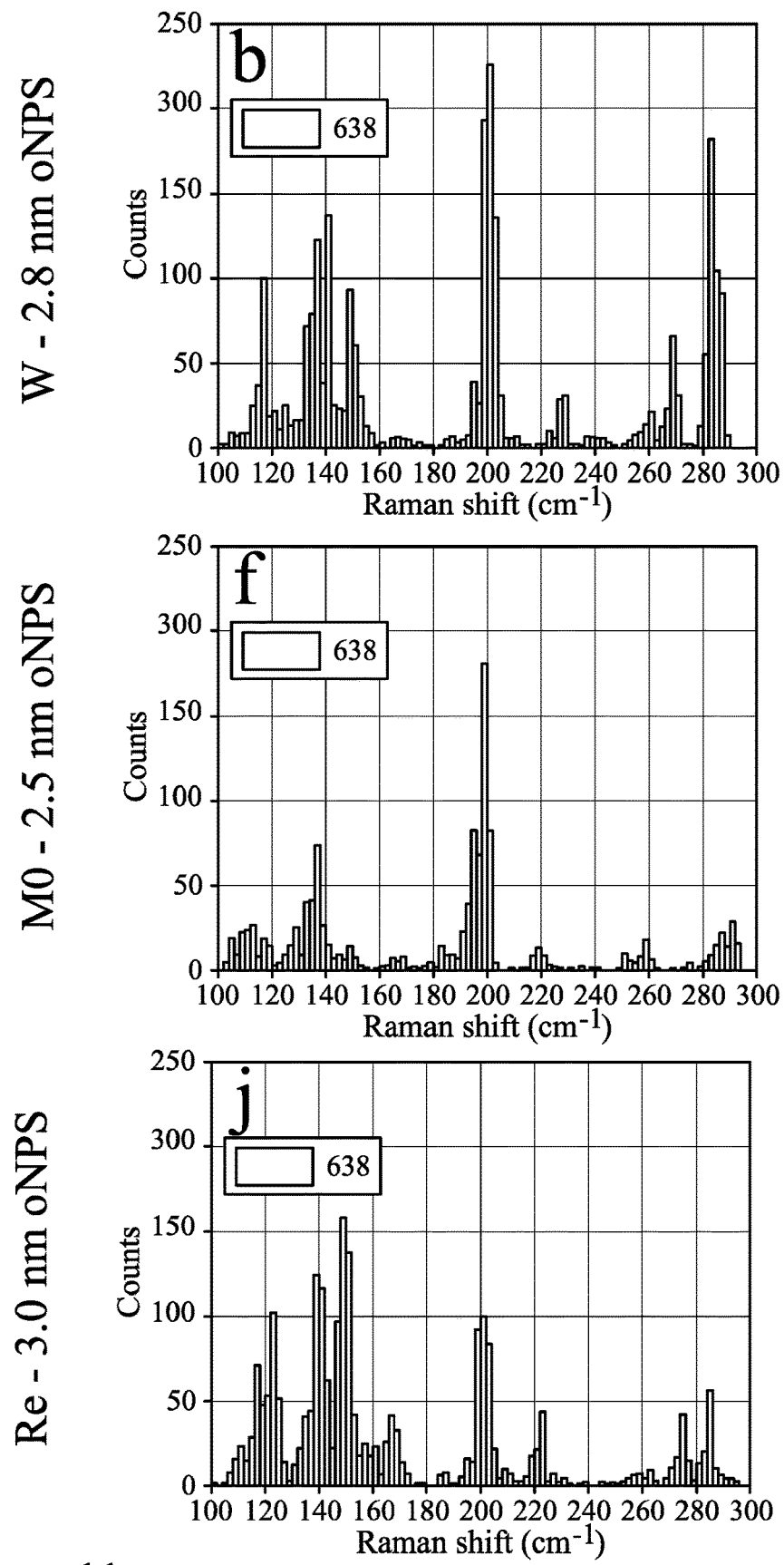
Figure 11:
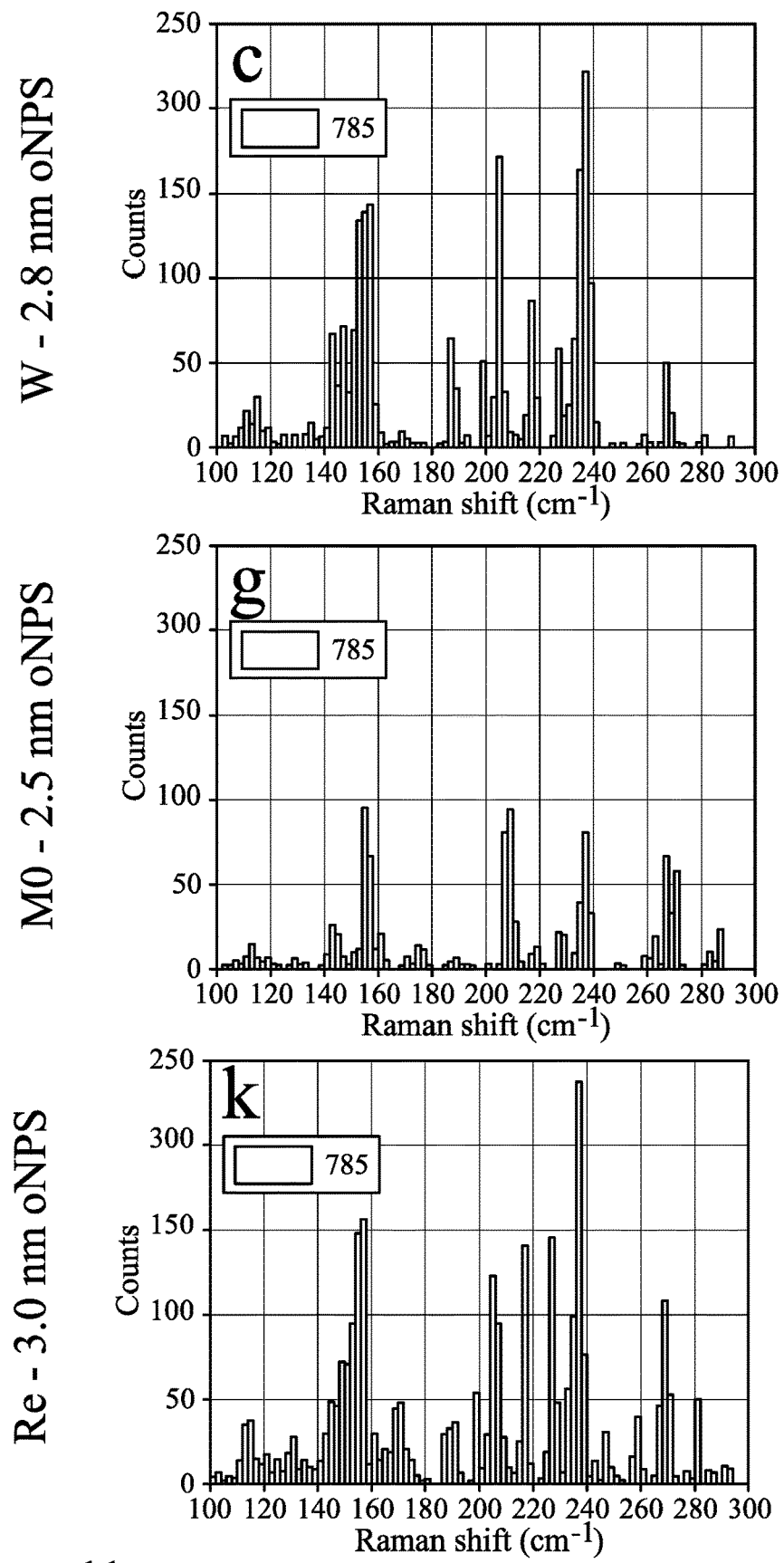
Figure 11:
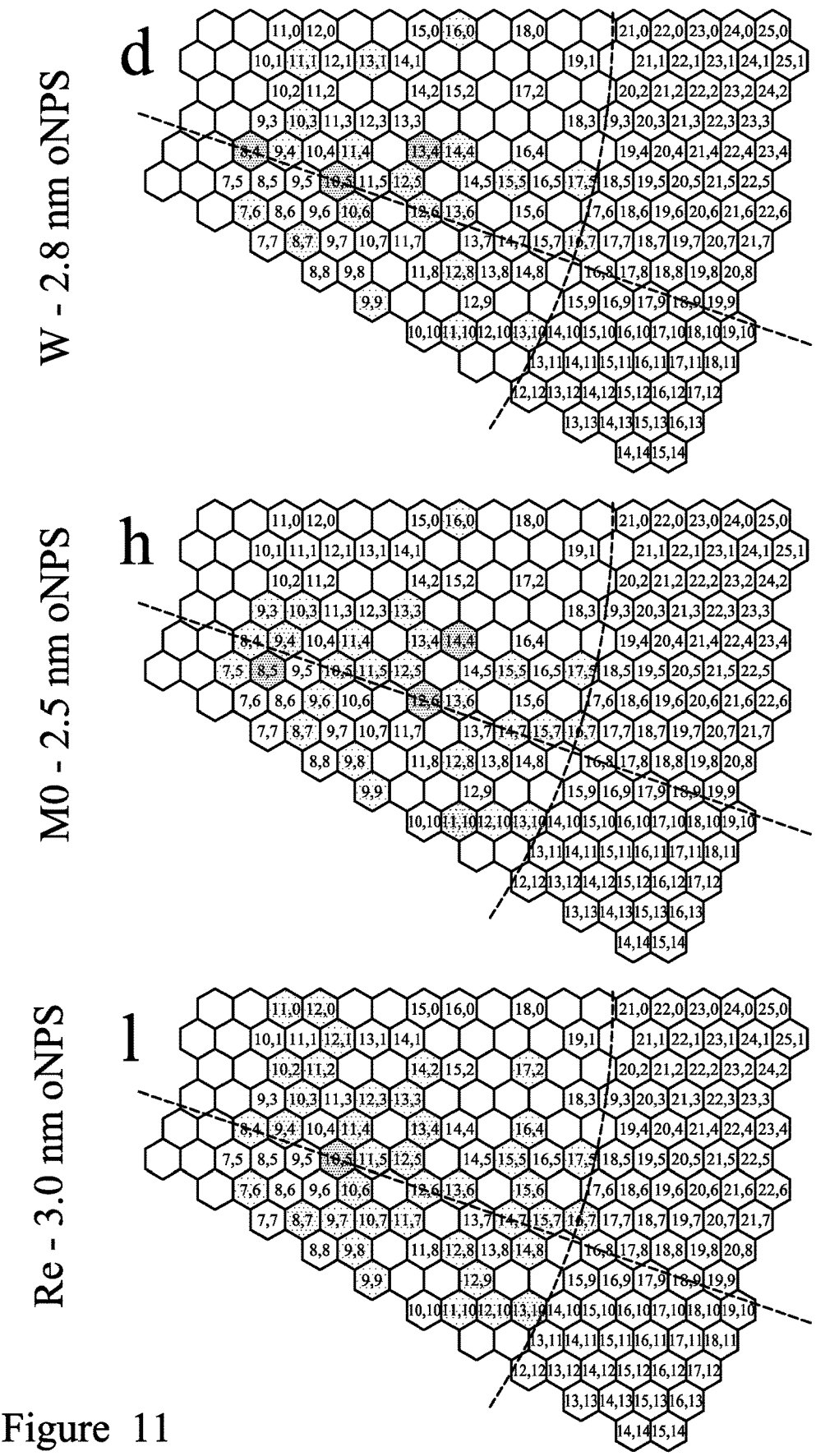
Figure 12:
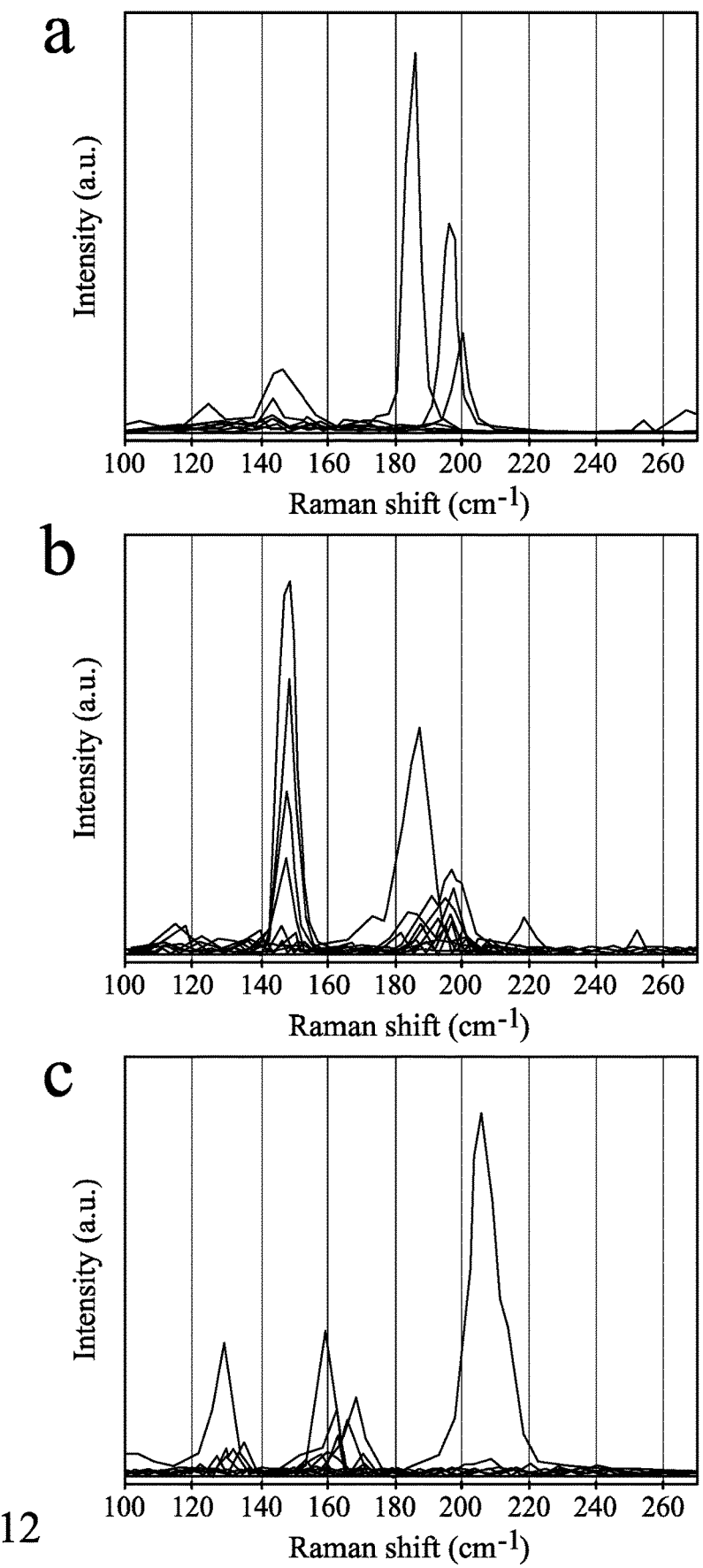
Figure 12:
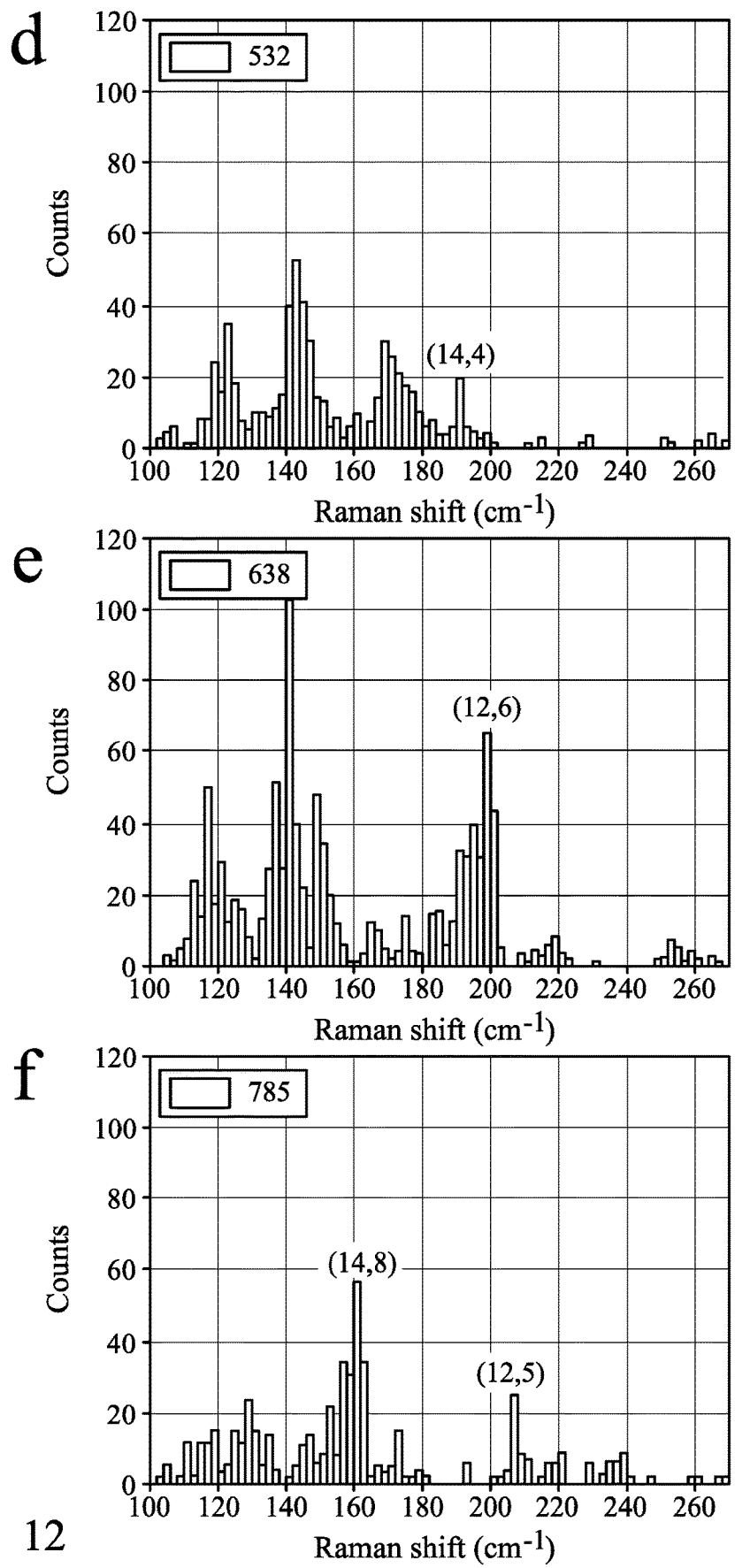
Figure 13:
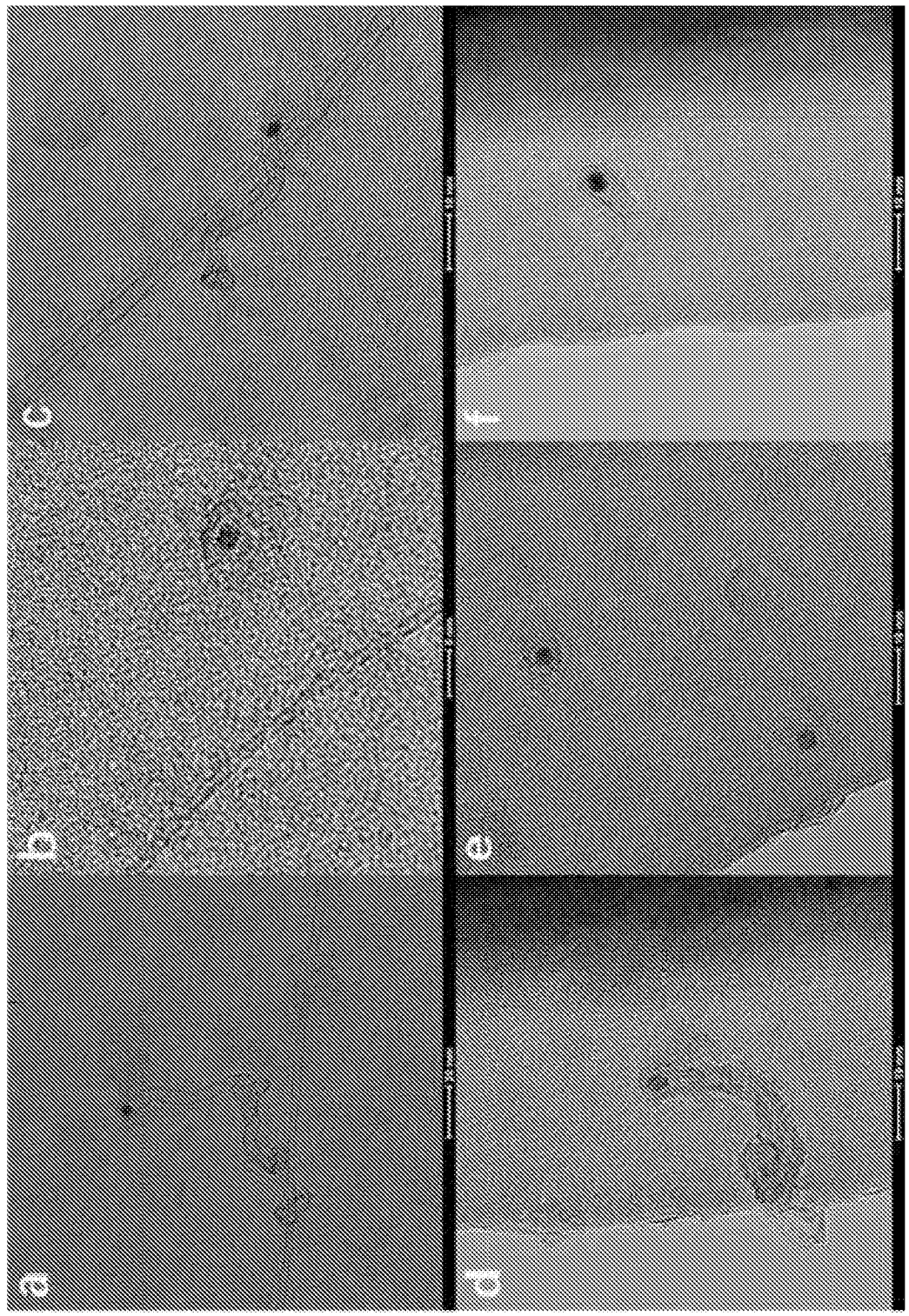
Figure 14:
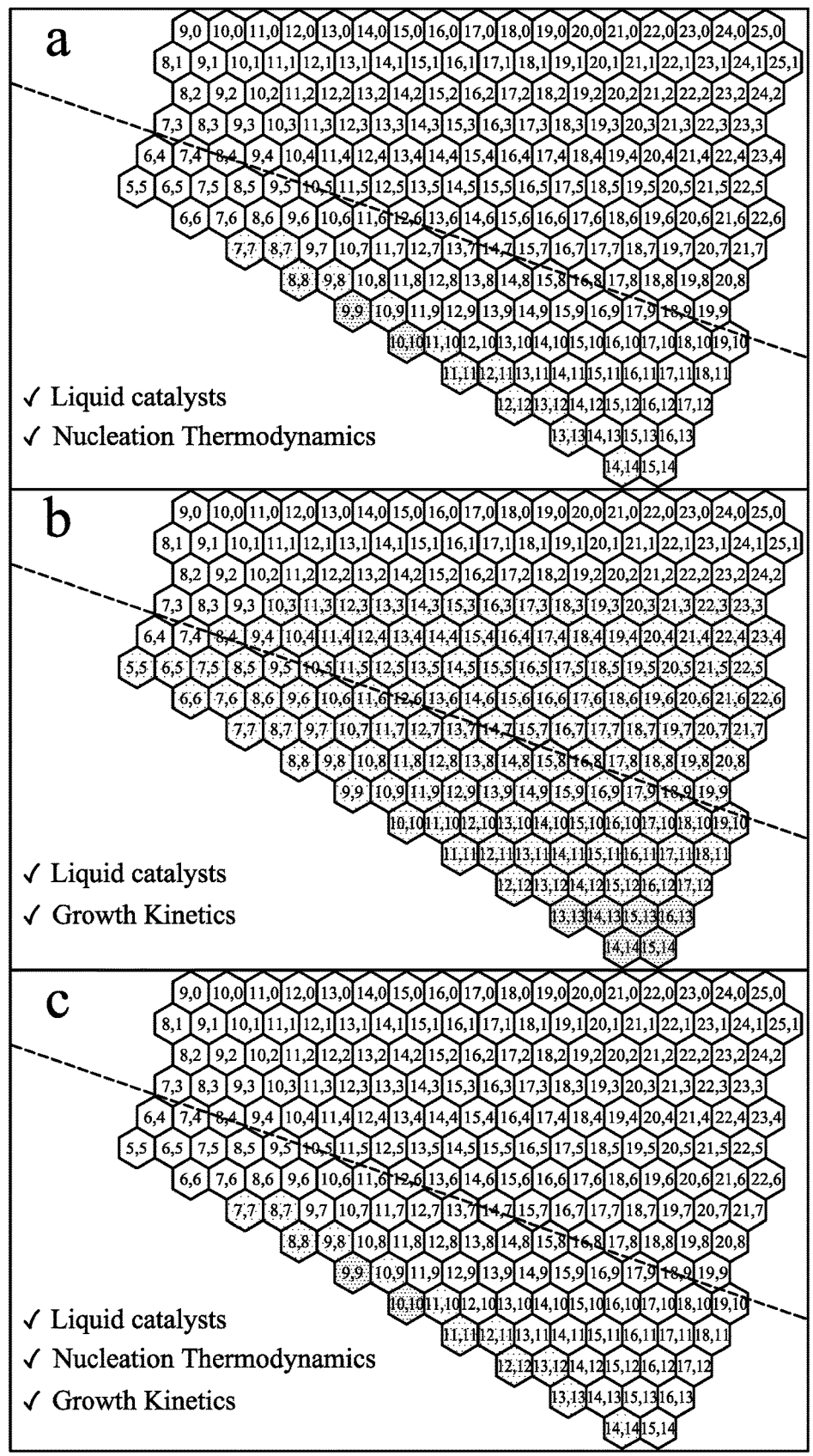
Figure 14:
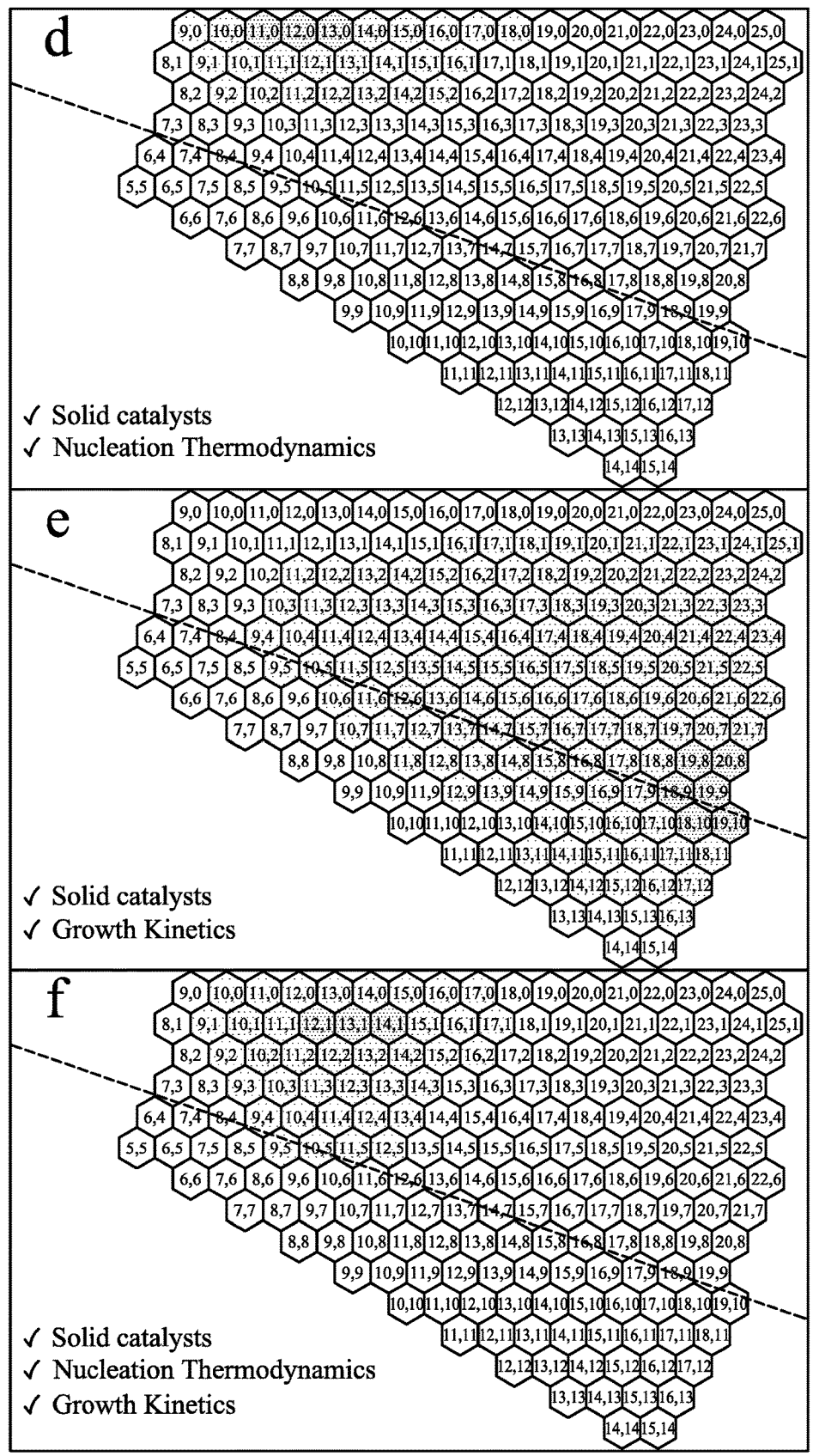
Figure 14:
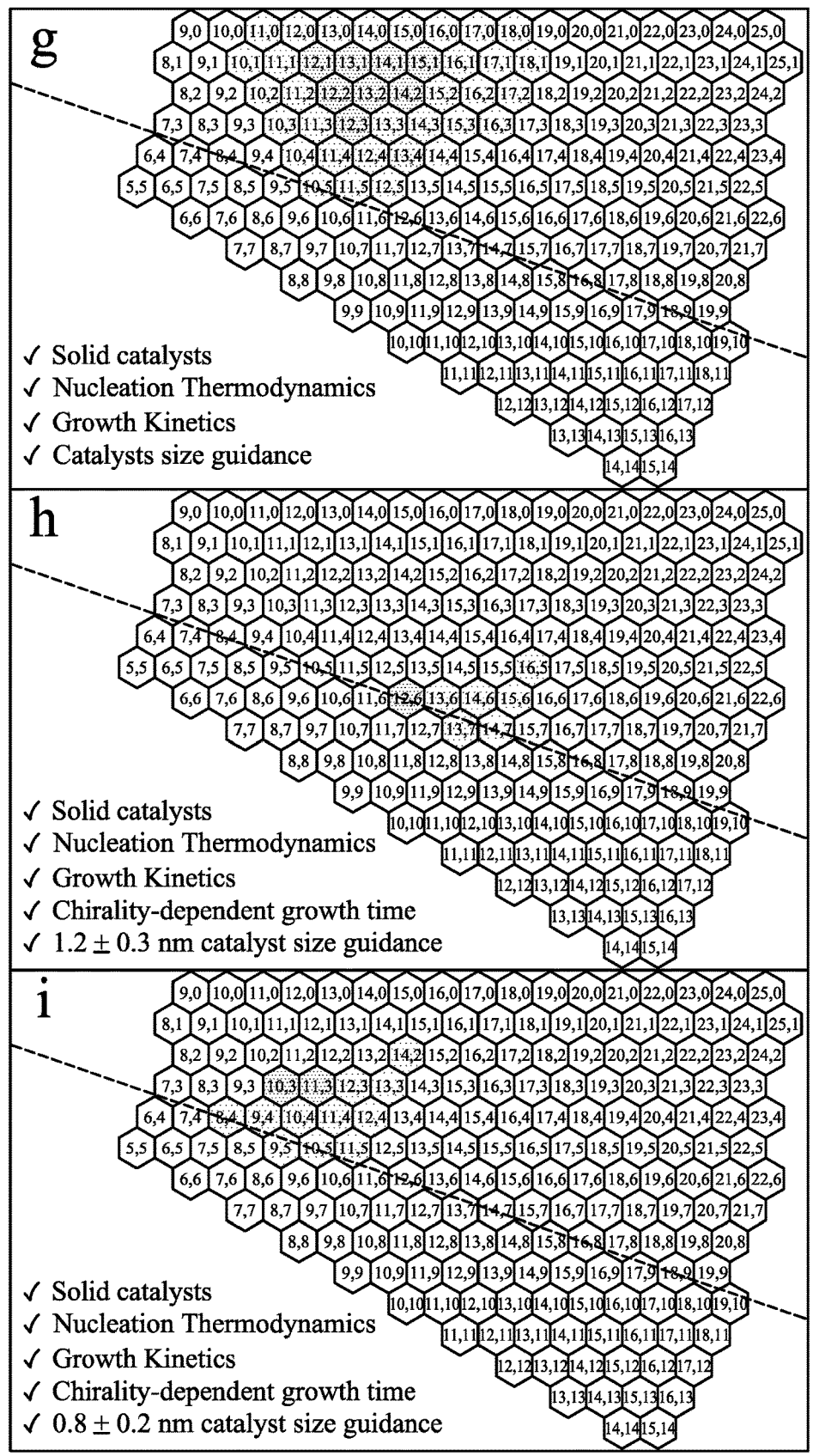

FIGS. 9a and b are TEM images which show that with guidance from atom steps, SWCNTs formed aligned arrays when grown from NPs deposited on (a) sapphire and (b) quartz substrate. The inset is the FFT of (a);

FIG. 10 is a schematic illustration of a DMA column;

FIGS. 11a-l shows the mass abundance statistics from Raman mapping in the RBM region for SWCNTs grown from (a-d) W~2.8 nm oNPs, (e-h) Mo~2.5 nm oNPs and (i-l) Re~3.0 nm oNPs detected by a (aei) 532 nm, (bfj) 638 nm and (cgk) 785 nm laser respectively. All results are normalized scale and displayed on a (dhl) graphene map in the diameter range 0.65-2 nm;

FIG. 12 shows the results of Raman mapping and abundance statistics of low carbon growth (C/H~6) of SWCNTs from Mo mNPs (~1.5 nm);

FIGS. 13a to 13c show HRTEM images of carbon-blinded catalyst and short CNTs from W mNPs (~2.6 nm);

FIGS. 13d to 13f show HRTEM images of carbon-blinded catalyst and short CNTs from Mo mNPs (~4.5 nm); and FIG. 14 shows the qualitative calculation of abundance based on different factors: (a) mass abundance of SWCNTs from a liquid catalyst considering only the nucleation thermodynamics factor (SWCNTs concentrate near the armchair region); (b) mass abundance of SWCNTs from a liquid catalyst considering only the growth kinetics factor based on screw dislocation theory (the growth rate of SWCNTs is proportional to chiral angle); (c) mass abundance of SWCNTs from a liquid catalyst considering both factors from (a) and (b) (the preferred region is around armchair chiralities but experiments show that the abundance is determined mainly by growth rate in (b) and results in wider distributed chiralities with large chiral angle); (d) mass abundance of SWCNTs from a solid catalyst considering only the nucleation thermodynamics factor based on reported interface energy values (the SWCNTs concentrate near the zigzag region); (e) mass abundance of SWCNTs from a solid catalyst considering only the growth kinetics (the growth rate will reach its maximum around 19.1° chiral angle); (f) mass abundance of SWCNTs from a solid catalyst considering both factors from (d) and (e) (the chirality preference is near zigzag as reported by Penev, E. S., Bets, K. V., Gupta, N. & Yakobson, B. I. Transient Kinetic Selectivity in Nanotubes Growth on Solid Co—W Catalyst. *Nano Letters* 18, 5288-5293, (2018) with the same interface energy values); (g) mass abundance of SWCNTs from a solid catalyst considering SWCNTs diameter size guidance from their catalysts (the distribution will be more concentrated). The normal distribution was used with a mean diameter of 1.2 nm and a standard deviation of 0.3 nm as shown in FIG. 2a; (h) mass abundance of SWCNTs from a solid catalyst considering chirality-dependent growth time (by growing SWCNTs in a carbon rich environment, the chirality-dependent growth time factor leads the abundance to be more concentrated around (2n,n), the threshold is set to poison ~½ catalysts); (i) mass abundance of SWCNTs from a solid catalyst with a narrower distribution and thinner size of catalysts (0.8±0.2 nm) with ~¼ catalysts to be poisoned (the semiconducting chiralities such as (8, 4), (10, 3), (9, 4) and (11, 3) are predicted to be enriched). (The modelling was done for all chiralities with a diameter between 0.65 and 2 nm, T=850° C. For liquid catalysts, the CNT catalyst interaction energy value of the edge atoms of A or Z type is 0.09 eV/atom and 0.345 eV/atom respectively which are reported for the Co (111) catalyst with a segregated A|Z interface (see Bets, K. V., Penev, E. S. & Yakobson, B. I. Janus *Segregation at the Carbon Nanotube-Catalyst Interface. ACS Nano*, (2019).). For solid catalysts, $E_{Int}^{A}$ is 0.147 eV/atom and $E_{Int}^{Z}$ is 0.144 eV/atom respectively which are reported for the $Co_7W_6$ solid catalyst with (003) W slab with a segregated A|Z interface (see Bets et al [supra]).

EXAMPLE

Figure 1:
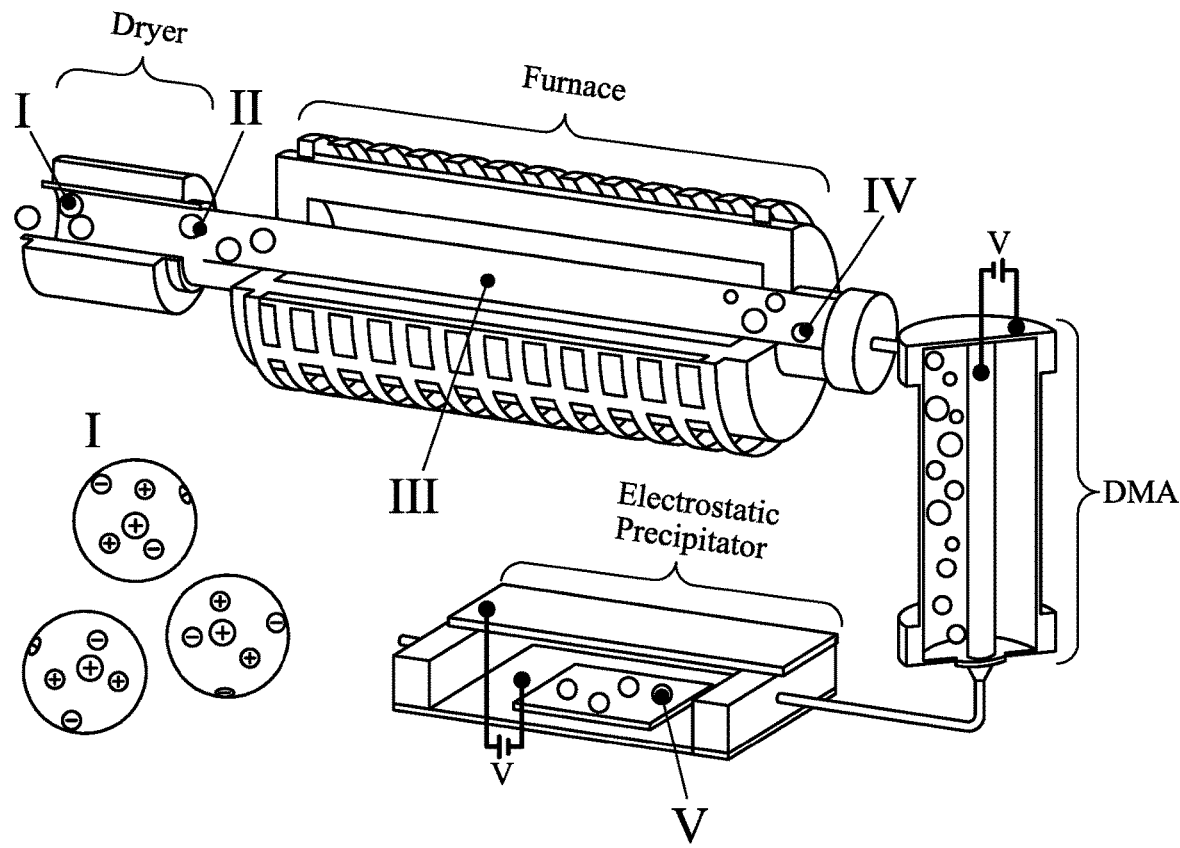
Figure 1:
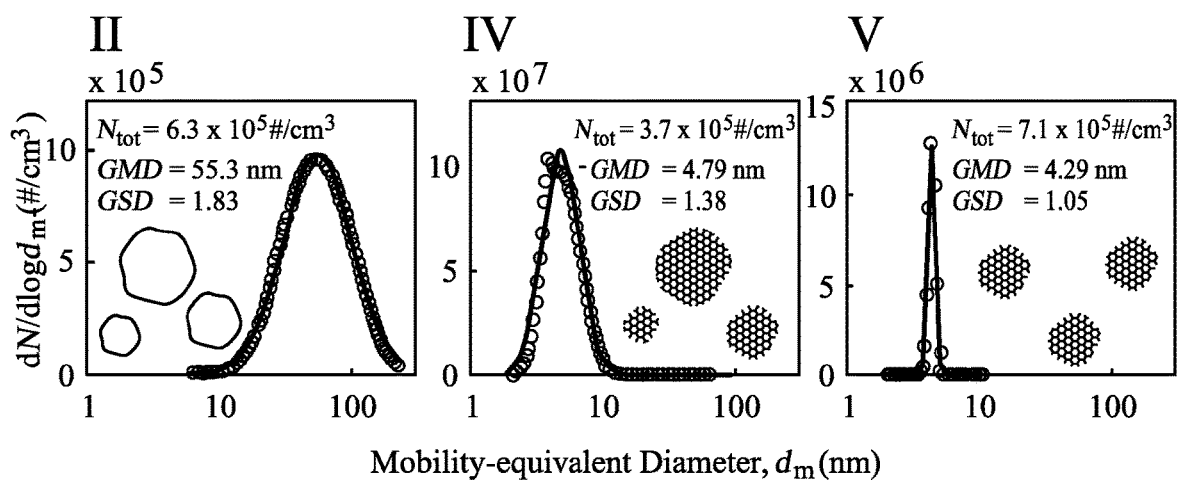

This Example relates to embodiments of the invention in which there is continuous gas phase production of size-selected, high melting point catalysts for SWCNT chirality control. Three refractory metals were studied: tungsten (W), molybdenum (Mo) and rhenium (Re). FIG. 1 is a schematic illustration of aerosol production and size-selection setup for continuous nanoparticle generation and collection and accompanying plots of mobility-equivalent diameter taken at various stages.

A highly dilute aqueous metal salt solution of each of $(NH_4)_6H_2W_{12}O_{40}$ (Sigma-Aldrich 463922), $(NH_4)_6Mo_7O_{24}$ (Sigma-Aldrich 09878) and $NH_4ReO_4$ (Sigma-Aldrich 316954) was prepared at a concentration of 0.3 mM with respect to the metal atoms. The highly dilute aqueous solution was atomized into droplets suspended in nitrogen using a flow rate of 3.6 slpm through a TSI Inc. 9302 atomizer. The resultant micro-droplet mist (location I in FIG. 1) contained solution droplets that had a diameter of approximately 1.5 μm. The mist was passed through a desiccant dryer where water was removed to leave precipitated metal salt nanoparticles (sNPs) suspended in the carrier gas as an aerosol (location II in FIG. 1). The metal sNPs were then sent through an alumina tube in a furnace set to 950° C. where they decomposed and calcined to form metal oxides. Since the oxides of the refractory metals possess a high saturation vapour pressure, the metal oxides completely vaporized in the high temperature zone of the furnace (location III). Upon exiting the furnace and cooling, the metal oxide vapour re-nucleated into metal oxide nanoparticles (oNPs) (location IV in FIG. 1). The use of the highly dilute salt solution permitted facile and accurate control of the input amount of metal sNPs and the precise control of the size of metal oNPs at location IV.

To produce a nearly monodisperse population of metal oNPs for collection, the polydisperse metal oNPs from the furnace were first charged using a radioactive charge neutralizer (TSI 3077) then sent through a DMA (TSI 3085) which selected a very narrow range of particles based on their charge to drag (diameter) ratio. During DMA size selection, the aerosol flow rate was set to 1.5 lpm and the sheath flow of the DMA was set to its maximum of 20 lpm to produce the narrowest particle size range.

To collect the nanoparticles for substrate-based growth or characterization, the DMA-selected nanoparticles (which remain charged) were sent into an electrostatic precipitator in which nanoparticles were deflected by the electric field (~50V/mm) and deposited onto a target substrate (location V). The areal density of oNPs (n) on the substrate could easily be tuned by changing the deposition time (t), considering aerosol concentration (c), collection efficiency ($\delta$), aerosol flow rate (v) and size of substrate (A):

$$n = cvt\delta/A \quad (1)$$

The concentration of NPs before and after the precipitator was monitored by a Condensation Particle Counter (CPC, TSI 3756).

Substrate-based CVD growth of SWCNTs followed methods outlined in Yang et al [supra] and Zhang et al [supra]. Specifically various substrate-deposited oNPs in $H_2$ were subjected to a temperature programmed reduction process to obtain solid metal nanoparticles (mNPs). Ethanol vapour as the carbon feedstock was then introduced in an argon carrier gas into the reaction zone. The $H_2$ flow rate was varied to tune the carbon:hydrogen (C/H) ratio of the growth environment. After a set growth time, the carbon-rich environment was expelled by $H_2$ and then cooled to room temperature.

Mechanism of Particle Size Selection

The DMA can select a specific particle size between its upper limit of nearly 1 µm down to its lower limit of around 1.7 nm. Specifically the DMA classifies particles by charge-to-aerodynamic drag ratio. If the charge state of the particles is known, the drag or "mobility" of the particles and the mobility-equivalent diameter (which is the diameter of a sphere that exhibits the same aerodynamic drag as the particles in question) can be determined. Thus for particles that are approximately spherical the mobility-equivalent diameter is close to the physical diameter. Mobility can be related to diameter using the following equation:

$$B = \frac{C_c}{3\pi\mu d_m} \quad (S1)$$

Here B is mobility (also referred to as mechanical mobility), $\mu$ is gas viscosity, $d_m$ is mobility-equivalent diameter and $C_c$ is the Cunningham slip correction factor (an empirical relation which corrects for the change in particle-gas interaction in the transition or free-molecular flow regimes rather than the continuum regime). The Cunningham slip correction can be determined as follows:

$$C_c = 1 + \frac{\lambda}{d_m}\left(2.34 + 1.05 e^{-0.39\frac{d_m}{\lambda}}\right), \quad (S2)$$

where $\lambda$ is the mean free path of the gas molecules. From this, the charge-to-drag ratio or "electrical mobility" (Z) can be calculated from the product of the mechanical mobility and the particle's charge:

$$Z = n_q eB = \frac{n_q e C_c}{3\pi\mu d_m}, \quad (S3)$$

where $n_q$ is the number of charges (electrons) and e is the elementary charge.

The DMA selects by electrical mobility by firstly passing the aerosol through a charge neutralizer which imparts on the particle sample the Weidensolar charge distribution (see Wiedensohler, A. *An approximation of the bipolar charge distribution for particles in the submicron size range*. Journal of Aerosol Science 19, 387-389, (1988)). The distribution is approximately neutral overall but contains particles with any number of charges and is also a function of particle size. For very small particles, the majority are neutral (~98%) and almost all particles that are charged will have either gained or lost a single electron whereas a negligible number will have at least two charges. The particles are then sent into the annular region between two concentric cylinders of the DMA column (see FIG. 10) in the "aerosol flow" $Q_a$. A voltage is applied to the inner cylinder and oppositely-charged particles move radially toward this cylinder while at the same time moving axially down the column in a sheath gas flow $Q_{sh}$. Particles with electrical mobility higher than the setpoint will impact the cylinder and are deposited there. Particles with lower mobility will exit with the bulk gas flow and are filtered out. Particles with electrical mobility that matches the setpoint pass into a small port at the base of the inner cylinder and are "classified" leaving the DMA via the sample flow $Q_s$.

The schematic illustration of a DMA column in FIG. 10 shows first to fifth particles identified from left to right as follows. The mobility of the first particle is too high and it impacts the inner cylinder. The second particle has the prescribed electrical mobility and is classified. The mobility of the third particle is too low and it exits the column in the sheath flow. The fourth particle is neutral and is unaffected by the electric field so it also exits in the sheath flow. The fifth particle has the incorrect charge polarity and is repelled towards the outer cylinder.

The performance of the DMA is responsible for the size range of catalyst particles and therefore the diameter range of the CNTs. The DMA classifies particles according to a triangular transfer function which means that in theory 100% of the particles at the prescribed size are transmitted through the DMA and particles with diameters larger and smaller than this are transmitted but with decreasing efficiency as their mobility-equivalent diameters deviate from the setpoint. In reality, particle diffusion results in some particle losses to the cylinder walls and a small amount of broadening of the transfer function. The minimum electrical mobility (maximum mobility-equivalent diameter) classified by the transfer function can be determined using the following relationship:

$$Z_{min} = (Q_{sh} + Q_s)\frac{\ln\left(\frac{r_2}{r_1}\right)}{2\pi VL}, \quad (S4)$$

where $r_1$ and $r_2$ are the inner and outer cylinder radii respectively, V is the voltage between the cylinders and L is the effective length of the column. Similarly the maximum electrical mobility (minimum mobility-equivalent diameter) classified by the DMA transfer function is equal to $$Z_{max} = (Q_{sh} + Q_a)\frac{\ln\left(\frac{r_2}{r_1}\right)}{2\pi VL}. \tag{S5}$$

For this Example, $Q_a$ is equal to $Q_s$ so the peak electrical mobility (Z*) of the transfer function is equal to $$Z^* = \frac{(Z_{min} + Z_{max})}{2} = \frac{Q_{sh}\ln\left(\frac{r_2}{r_1}\right)}{2\pi VL}. \tag{S6}$$

If the sheath flow is maintained constant, it is the voltage between the cylinders that dictates the classified electrical mobility. Moreover the gas flow rates dictate the width of the transfer function (ie the size range of classified particles). Specifically the width is determined by the ratio of the sheath gas in the DMA to the sample flow in and out of the DMA. The ratio of the sheath flow rate to the sample flow rate is known as the resolution and is equivalent to the normalized full-width half-maximum of the transfer function. It is therefore of interest to maximize the DMA resolution to produce the narrowest range of catalyst particles. For a triangular distribution, the normalized full-width half-maximum will be half of the difference between the minimum and maximum transmitted electrical mobilities, divided by the peak electrical mobility:

$$FWHM = \frac{(Z_{max} - Z_{min})}{2Z^*} = \frac{Q_a}{Q_{sh}}. \tag{S7}$$

As can be seen above, the narrowest size range of particles will be classified when the DMA sheath flow is large compared to the aerosol/sample flow. Fortunately electrical mobility also scales with sheath flow rate which means that the largest electrical mobility and therefore the smallest mobility-equivalent diameter can be classified when the sheath flow is high. Thus both the size range and transfer function resolution are favourable at high sheath flow so it is of interest to maximize this value. For this Example, the aerosol flow rate was 1.5 lpm and the sheath flow was set to 20 lpm corresponding to a resolution of 13.3 which is larger than the standard resolution of 10.

While charged particles can be reliably classified using the DMA, it should be determined whether small uncharged particles would be capable of migrating through the DMA via Brownian motion fast enough to also be classified. This phenomenon can be checked by calculating the approximate distance the particles should be able to diffuse given the amount of time the aerosol spends in the DMA. The one-dimensional root mean square diffusion distance ($x_{rms}$) can be determined as follows:

$$x_{rms} = \sqrt{2Dt}. \tag{S8}$$

Here D is the particle's diffusion constant and t is the diffusion time. The diffusion constant is equal to $$D = kTB, \tag{S9}$$

where k is Boltzmann's constant, T is temperature and B is mechanical mobility defined above. The diffusion time is determined by calculating the velocity within the annular region of the DMA and combining this value with the effective DMA length. Diffusion time (t) in the DMA is $$t = \frac{L}{\vec{V}} = \frac{AL}{Q} = \frac{\pi(r_0^2 - r_i^2)L}{Q}, \tag{S10}$$

where L is the DMA length, $\vec{V}$ is gas velocity, Q is volumetric flow rate, A is the annular cross-section within the DMA and $r_o$ and $r_i$ are the outer and inner radii of the DMA column respectively.

Using the geometry of a model 3085 DMA, an aerosol flow of 1.5 lpm, a sheath flow of 20 lpm and air at standard conditions as the carrier gas, a 1 nm particle should diffuse 1.13 mm. Compared with the annular gap distance of nearly 10 mm, this diffusion rate is not sufficient to allow neutral NPs to migrate to target substrates, especially considering that this calculation is one-dimensional and in reality some of the particle's Brownian motion will also be in the axial and circumferential directions of the DMA.

Characterisation

Particle size distributions were analysed using a scanning mobility particle sizer spectrometer (SMPS) which consists of a combination of a DMA and CPC. The DMA scans through its particle size range and the CPC records the corresponding number concentration of each size bin (specifically the mobility-equivalent diameter of the particles). The vertical axis dN/d log $d_m$ in FIG. 1 represents the number concentration of that bin normalized by bin width. Measured data was fit using lognormal distributions as is standard practice in aerosol science. These give the geometric mean diameter (GMD, peak position), geometric standard deviation (GSD, width) and total number concentration ($N_{tot}$, area under distribution) of a sampled aerosol.

AFM was conducted on a Veeco Dimension Pro AFM on Peakforce mode.

HRTEM was conducted on FEI Talos F200X TEM (200 kV for NPs, 80 kV for CNTs) with oNPs collected onto $Si_3N_4$ grids. The reduction and CNT growth stages were conducted in situ on the $Si_3N_4$ grids before characterization.

Electron diffraction (ED) of suspended CNTs was conducted on FEI Tecnai F20 FEG TEM working on 80 kV with STEM nanobeam mode. The $Si_3N_4$ grid with CNTs grown was punctured occasionally to obtain suspended CNTs stretching out from the substrate.

For XRD characterization, the oNPs were vacuum filtered onto Anodisc aluminium oxide membrane filters (AAO, Whatman FIL3010). The size of the oNPs was controlled and constrained by the concentration of the aqueous salt solution. The oNPs on AAO were reduced in $H_2$ resulting in mNPs which were then used for typical CNT growth. XRD characterization was performed at each stage.

Raman mapping was conducted in the RBM range (70-350 $cm^{-1}$) with 532, 638, and 785 nm lasers. Details are presented in Table 1. The laser spot raster-scanned randomly-oriented CNTs grown on $SiO_2$/Si substrates with location marks. The step size was set to 3 μm in both the x and y directions. The peaks of each spectrum in the RBM Raman map were identified after background removal and were then associated with chiralities based on a Kataura plot (see Kataura, H. et al. *Optical properties of single-wall carbon nanotubes*. Synthetic Metals 103, 2555-2558, doi: https://doi.org/10.1016/SO379-6779(98)00278-1 (1999)).

Abundance statistics obtained by different lasers were normalized by pixel number and pixel size.

TABLE 1

Experimental details for Raman analysis

| λ (nm) | N.A. | Power (mW) | Grating (gr/mm) | Setup |
|---|---|---|---|---|
| 532 | 0.50 | 6.25 | 1800 | Horiba Xplora Plus |
| 638 | 0.50 | 7.5 | 1800 | Horiba Xplora Plus |
| 785 | 0.75 | 10 | 1200 | Bruker Senterra |

Figure 6:
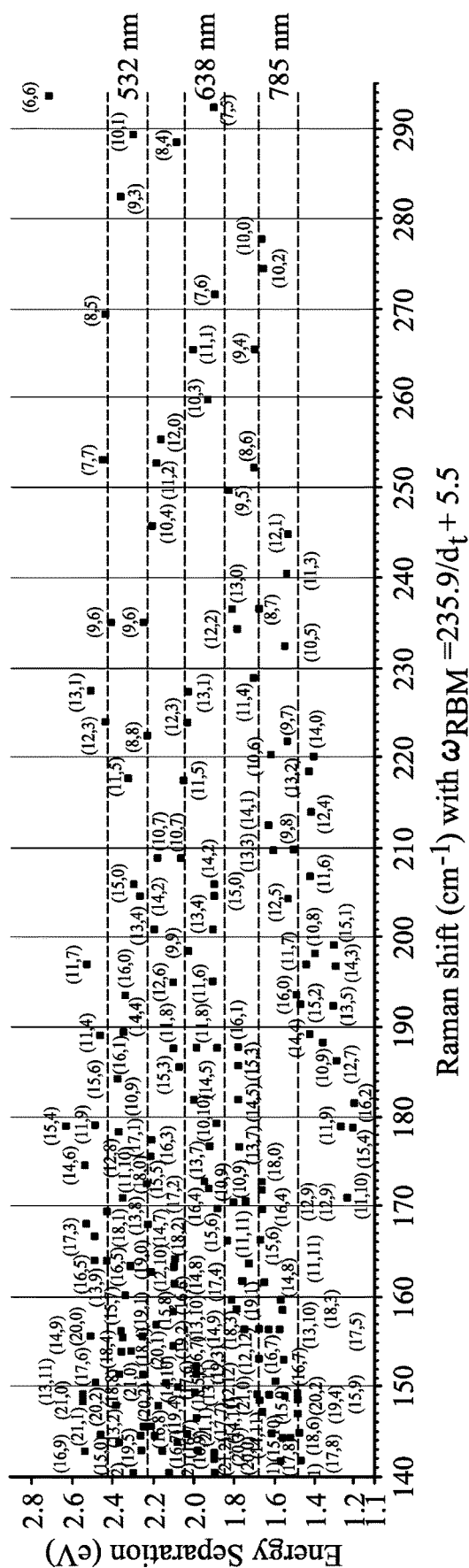
FIG. 6 is part of a rectified Kataura plot for SWCNT arrays grown directly on $SiO_2$/Si substrates. 532 nm, 638 nm and 785 nm laser resonance regions are marked with dash lines and the broadening factor was set to 100 meV for each.

It is well known that in order to determine the (n, m) based on the Kataura plot, $E_{ii}$ and ωRBM-dt are strongly affected by the environments in which CNTs are located. Using the Kataura plot with the proper environment rectification is vital to get reliable identification. Thus the rectified Kataura plot as shown in FIG. 6 was used. For all data, the starting point was the experimental data of nanotube optical transitions developed from suspended single isolated SWCNTs based on electron diffraction and Rayleigh scattering (see Liu K. H. et al. An atlas of carbon nanotube optical transitions. *Nat. Nanotechnol.* 7, 325-329, doi:10.1038/Nnano.2012.52 (2012)). $E_{ii}$ was modified with a redshift of 40 meV to account for the environmental interaction between SWCNTs and silica substrates. The resonance window (broadening factor) was set to 100 meV (see Saito, R., Hofmann, M., Dresselhaus, G., Jorio, A. & Dresselhaus, M. S. Raman spectroscopy of graphene and carbon nanotubes. *Adv. Phys.* 60, 413-550, doi:10.1080/00018732.2011.582251 (2011)). Some metallic thin SWCNTs may have a larger value because of exciton-phonon coupling (see Doorn, S. K., Araujo, P. T., Hata, K. & Jorio, A. Excitons and exciton-phonon coupling in metallic single-walled carbon nanotubes: Resonance Raman spectroscopy. *Phys. Rev. B* 78, 165408, doi:10.1103/PhysRevB.78.165408 (2008)) which was also considered during (n, m) identification. As for the ωRBM-dt relationship, the reported ωRBM=235.9/dt+5.5 for SWNTs grown on $SiO_2$/Si substrates was followed (see Zhang, D. et al. (n,m) Assignments and quantification for single-walled carbon nanotubes on SiO2/Si substrates by resonant Raman spectroscopy. *Nanoscale* 7, 10719-10727, doi:10.1039/C5NR01076D (2015)).

As can be seen in FIG. 6, chiralities with their RBM located below 155 $cm^{-1}$ (corresponding diameter ~1.76 nm) are densely distributed. Considering the resolution of Raman, unambiguous identification becomes impossible. Therefore it was only possible to calculate precisely the abundance of chirality for SWCNTs with a small diameter. The peaks of large diameter were counted but not assigned to specific chiralities.

To account for the visible percentage of chiralities and multi same chirality tubes under the same laser spot, the reported method to quantify the percentage of (n, m) SWNTs within the range 0.81 nm (295 $cm^{-1}$)-1.53 nm (160 $cm^{-1}$) was followed (see Zhang [supra]).

Results

FIG. 1 shows the aerosol size distributions of Re sNPs, oNPs and size-selected oNPs at locations II, IV and V. The nanoparticle size distribution peak position, peak width (height independent) and total number concentration are described by geometric mean diameter (GMD), geometric standard deviation (GSD) and $N_{tot}$ respectively.

Figure 7:
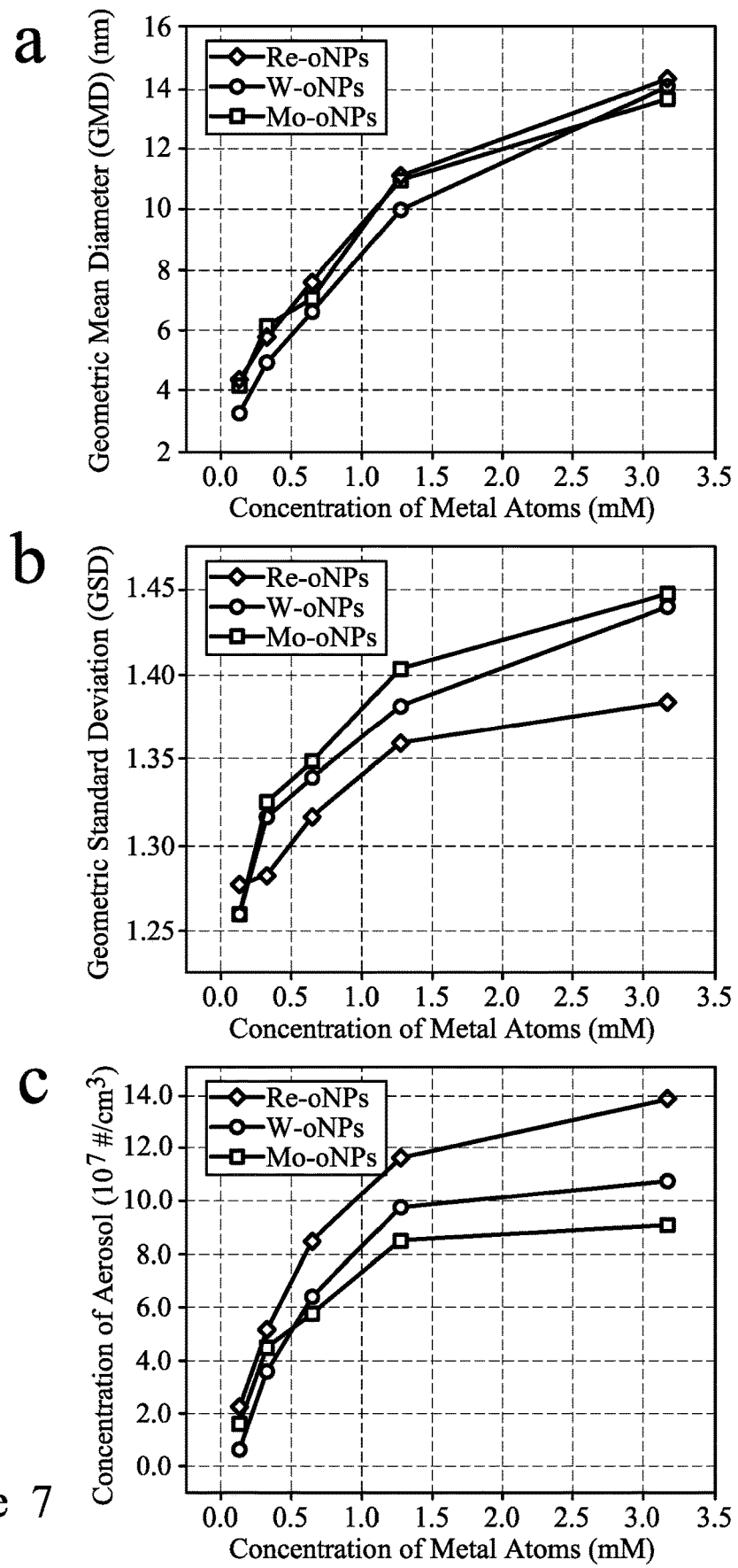
FIG. 7 shows the relationship between the concentration of atomized solutions and (a) the mean diameter (GMD), (b) standard deviation (GSD) and (c) concentration of oNPs measured at location IV in FIG. 1.

After drying the solution droplets (location II in FIG. 1), the sNPs have a mobility-equivalent diameter of several tens of nanometres and a wide distribution. FIG. 1 shows sNPs with a GMD of 55 nm and a GSD of 1.83. This distribution is very wide considering that at equilibrium, lognormally-distributed aerosol size distributions possess GSDs of approximately 1.4. These particles are clearly too large and polydisperse for growth of SWCNTs. Vaporization and renucleation in the furnace produce critically much smaller oxide particles in significantly high concentration (as shown for location IV). The oNPs are an order of magnitude smaller in size (GMD is 4.8 nm) and nearly two orders more numerous than the preceding sNPs. The distribution is also narrower with a GSD of 1.38 which is very near to that of an equilibrium or "self-preserving" size distribution. Given this GMD and GSD, the full-width half-maximum of the distribution is 3.7 nm. Thus after re-nucleation the size of the oNPs is preliminarily constrained. The dominant size of oNPs can also be preliminarily adjusted with variations in the concentration of the atomized solution (see FIG. 7).

Although the peak size of oNPs at location IV is much smaller than the sNPs in location II, the distribution is still polydisperse. To obtain an even narrower size range, the DMA was used at location V with the output distribution set to a prescribed GMD of 4.15 nm. SMPS scans show excellent agreement to this setting since the resultant GMD was 4.31 nm. The distribution was extremely narrow (nearly monodisperse) with a GSD of only 1.05. A GSD of 1 represents an infinitely thin distribution of particles at exactly one size (perfectly monodisperse).

After passing through the DMA, the full-width half-maximum of the size distribution should be 7.5% of the setpoint. For the setpoint of 4.15 nm this corresponds to an extremely narrow full-width half-maximum of 0.31 nm. In reality the distribution broadens slightly and was approximately 0.52 nm. Since the width of the distribution scales with the midpoint setting, selection of a smaller size also corresponds to a smaller full-width half-maximum.

Using AFM and TEM the size distribution of NPs was precisely characterised. As shown in FIG. 2a-c, particles of various narrow size ranges were deposited homogenously on the target substrate by electrostatic precipitation. The size of NPs can be tuned precisely by varying the DMA setpoint (see FIG. 2f) and smaller DMA setpoints also correspond to narrower distributions. Whether large or small, the size distributions of deposited NPs used for SWCNT growth were narrow and the standard deviation (a) was at most 0.6 nm. Distributions as narrow as those observed in this Example are difficult to achieve from other methods and to date all other methods are batch processes that rely either on complicated fabrication techniques or specialized expensive precursors and often rely on specific substrate compositions. The method of the invention in this Example is able to continuously produce narrowly-distributed nanoparticles which can be directly deposited on any substrate.

Figure 8:
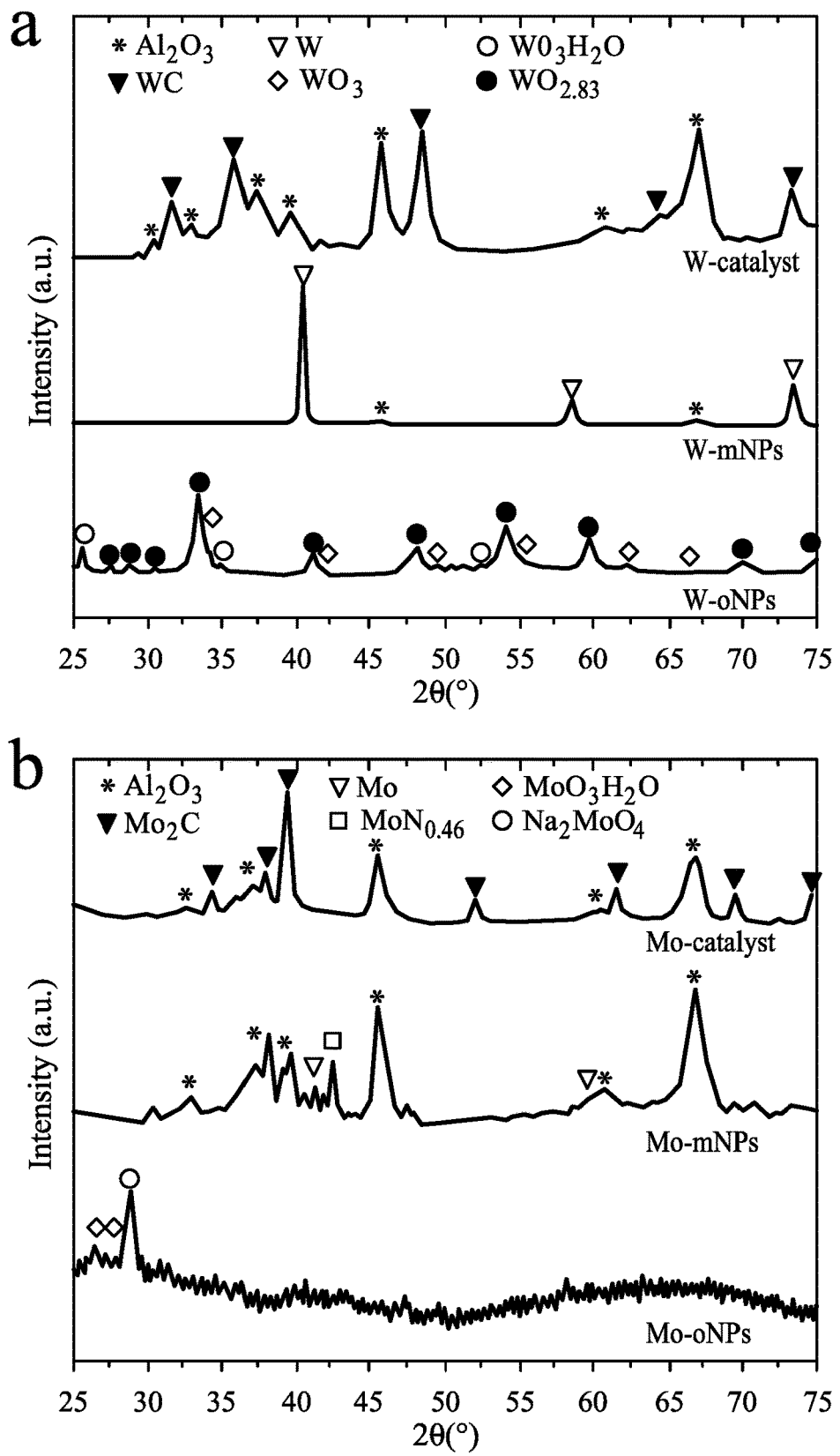
FIG. 8 shows XRD patterns of (a) W, (b) Mo and (c) Re nanoparticles and of (d) Re nanoparticles formed in the presence of a source of carbon.
Figure 8:
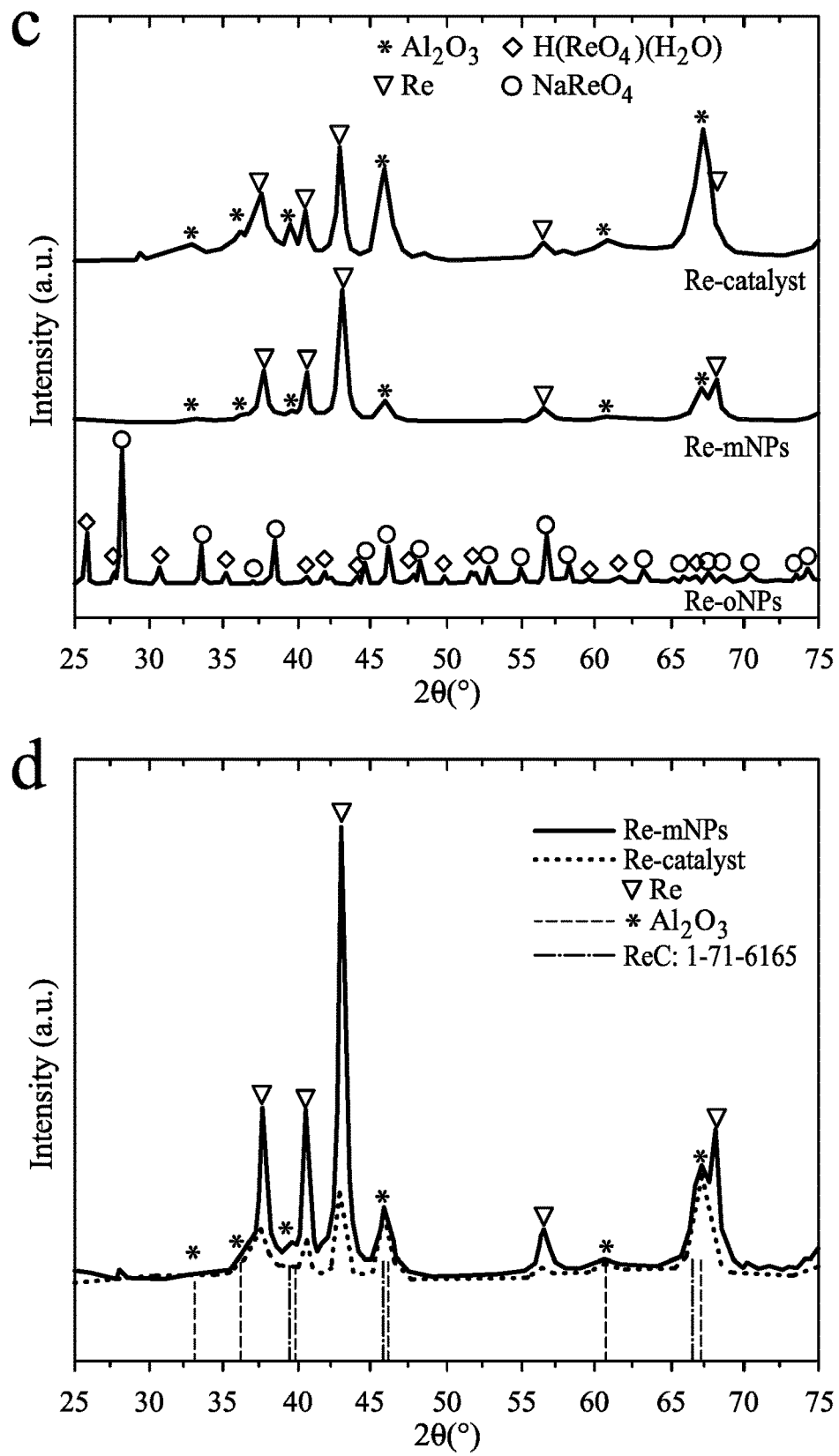

At the point of collection, the NPs were in the form of oxidized metals (determined from the XRD profiles shown in FIG. 8). From HRTEM (see FIG. 2d inset), the oNPs seemed to be closely packed polycrystals. After reduction at high temperature in $H_2$, the oNPs were reconstructed into single crystal elemental mNPs (see FIG. 2e). In FIG. 2f for Mo, the HRTEM results of the size distributions at various stages are summarized. Reduction and reconstruction reduced the mNP diameter to ~60% of the diameter of as-collected oNPs (black arrows in FIG. 2f). During carbon growth, the catalyst particles did not display noticeable variation in diameter compared with mNPs. The size of mNPs closely matched the diameter of their corresponding CNTs.

Figure 3:
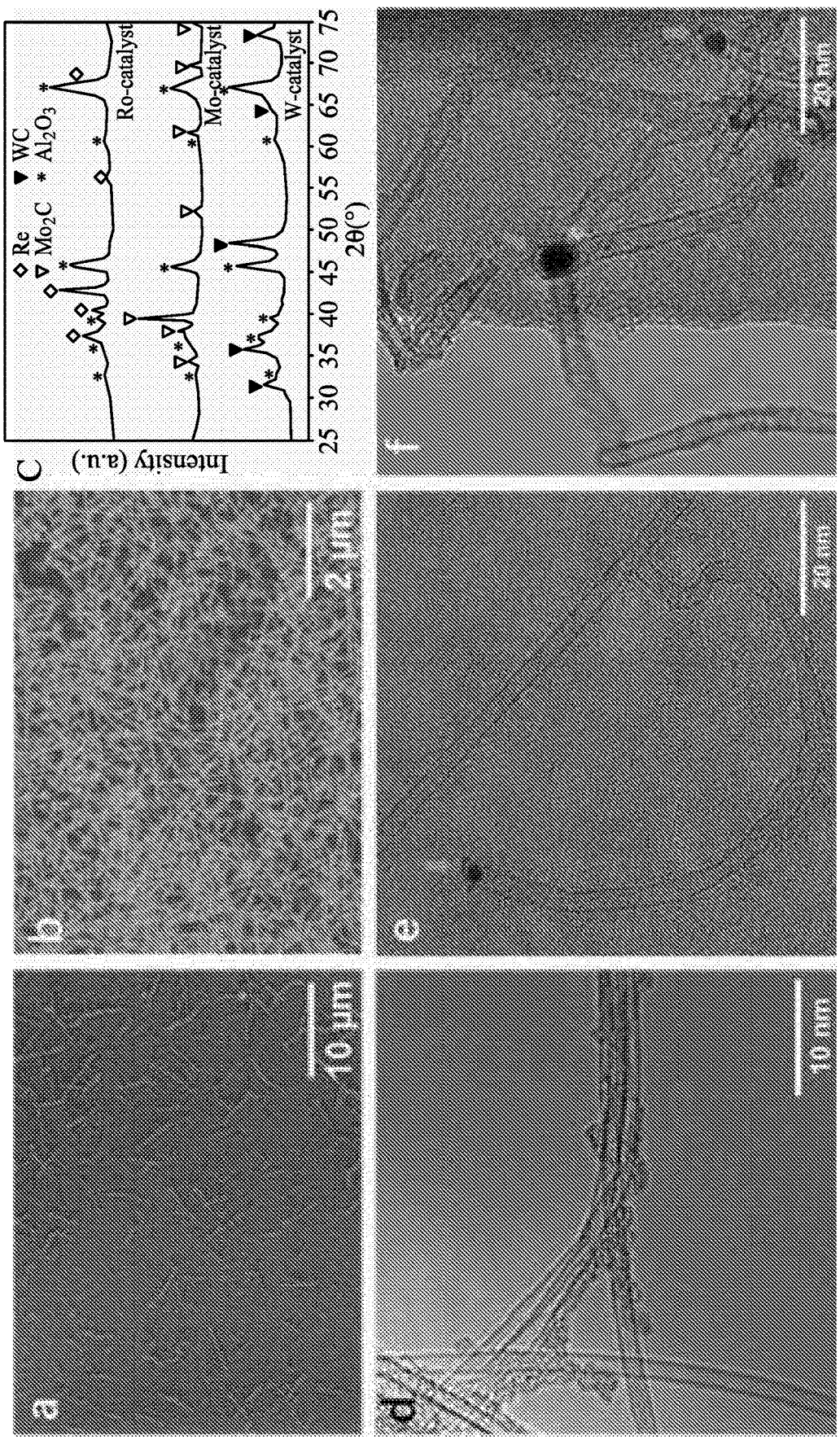

XRD profiles are shown in FIGS. 3c and 8. The oNPs were reduced in $H_2$ which results in mNPs. With the introduction of a carbon source, the mNPs supported the growth of CNTs. FIGS. 3c and 8 show that during the growth process, W and Mo form WC and $Mo_2C$ respectively, while Re retains its elemental state. $Mo_2C$ possesses an orthorhombic crystal system and the space group Pbcn (point group $D_{2h}$). By contrast, WC and Re exhibit a hexagonal crystal system with the space group P6m2 (point group $D_{3h}$) and $P6_3$/mmc (point group $D_{6h}$) respectively. WC, $Mo_2C$ and Re have very high melting points which ensures that their solid state is maintained during growth. Critically this feature allows the catalysts to surpass liquid catalysts with regard to their ability to reliably control SWCNT chirality. The maintenance of the solid state during reduction and growth also makes size selection more worthwhile compared with size selection of liquid catalysts because of suppressed Ostwald ripening. With regard to FIG. 8d, the patterns of ReC overlap partial patterns of $Al_2O_3$. Thus the profiles of Re mNPs and Re catalyst with the peak ~46° were normalized. Peaks of two profiles around 610, 33° and 36° also match $Al_2O_3$ thus ruling out the presence of ReC.

During XRD characterization, it is difficult to prevent the oNPs (especially Re oNPs) absorbing water vapour from the environment to form a hydrate or weak acid. Sodium ions in the oNPs are inevitable impurities. However the catalysts were not affected by the impurities. Amorphous AAO was reduced and annealed partially during reduction and growth.

SWCNTs Growth and Catalyst Constraint

Using typical growth parameters, the concentration of SWCNTs was controlled by varying the areal density of deposited oNPs. This was achieved simply by modifying the collection time and low and high areal density cases are shown in FIGS. 3a and b respectively. Due to the gas-phase nature of the catalyst formation, the particles have no dependence on substrate. A range of substrates could be used to support the oNPs for SWCNTs growth. On marked $SiO_2$/Si (FIGS. 3a and b), random SWCNTs were grown directly without any ex situ transfer process. With step guidance from sapphire and ST-cut quartz substrates, aligned SWCNT arrays have also been synthesized (see FIG. 9).

As shown in FIGS. 3d-f, the diameter of SWCNTs is strongly influenced by the size of the mNPs and ultimately by their preceding oNPs (FIG. 2f). Most SWCNTs grown on a given substrate show similar diameters. These results once again verify the dominant role of catalyst size on the resultant SWCNT structure. With ~6.7 nm oNPs (mNPs~4.5 nm), few-walled CNTs with numerous kinks were the dominant product with lengths of tens of micrometres (FIG. 3f). With ~4.3 nm oNPs (mNPs~2.6 nm), longer and higher quality SWCNTs with diameter ~3 nm were grown (FIG. 3e). With ~2.4 nm oNPs (mNPs~1.4 nm), SWCNTs with diameter ~1.5 nm are dominant (FIG. 3d). With these small and narrowly-distributed sizes of oNPs (normally <2.5 nm, mNPs<1.5 nm), fine chirality control of the SWCNTs has been achieved.

From TEM, CNTs show tangential growth from the solid catalysts resulting in a "pea pod" structure (see FIGS. 3e and f) with the catalyst maintaining its spherical shape without reshaping as is commonly the case with liquid catalysts. It is worth noting that catalysts were frequently found to be totally enclosed by a layer of carbon independently of whether the CNT was successfully grown or not (FIGS. 3e, f and FIG. 13).

Chirality Constraints from Solid Catalysts

Figure 4:
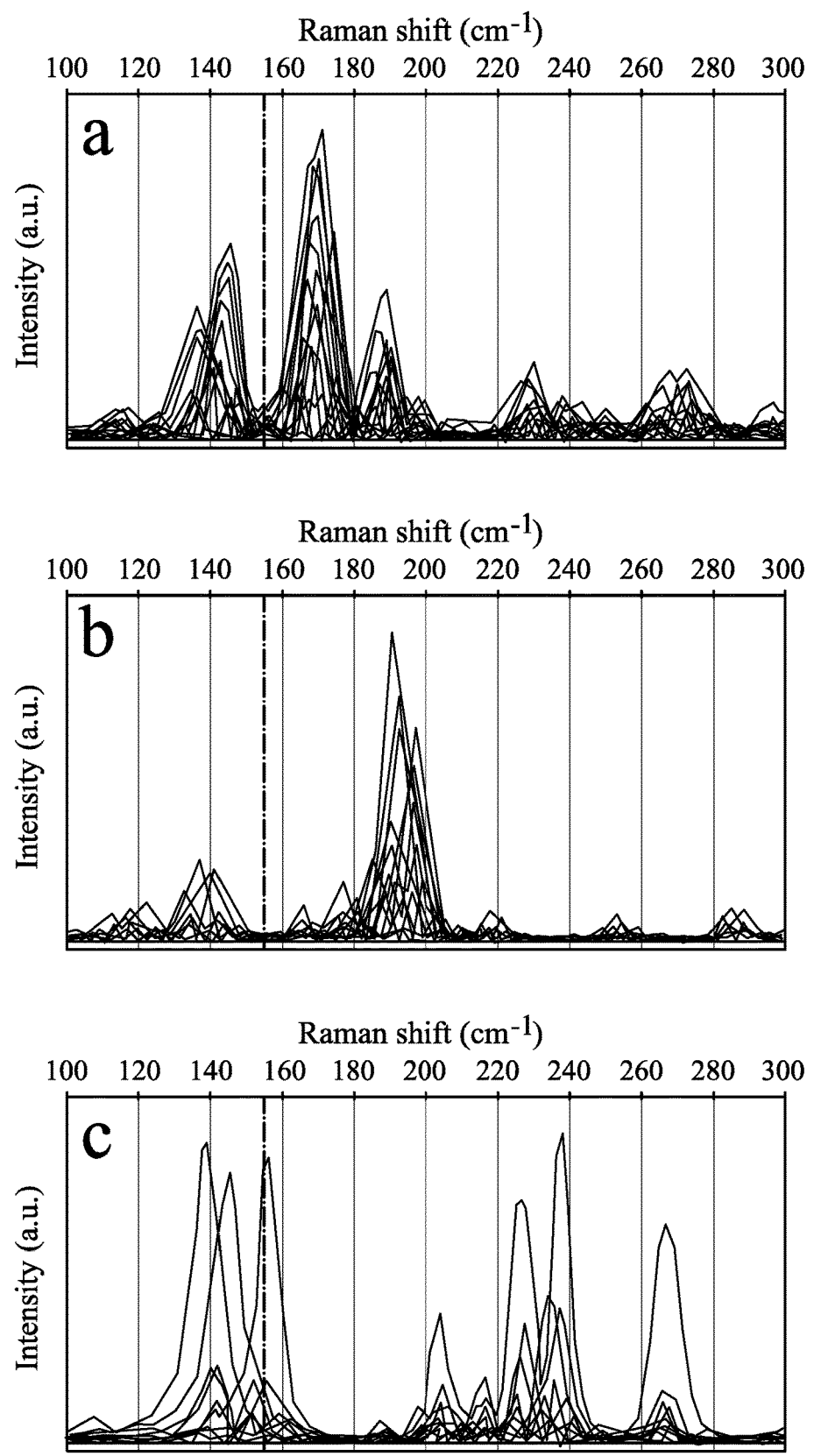
FIG. 4g is the mass abundance statistics displayed on a graphene map in the diameter range 0.65-2 nm.
FIG. 4h is a graphene map of the summarized abundance results from electron diffraction identification.
FIG. 4i is an electron diffraction pattern of a (12, 5) tube (left: experiment, right: simulation)
Figure 4:
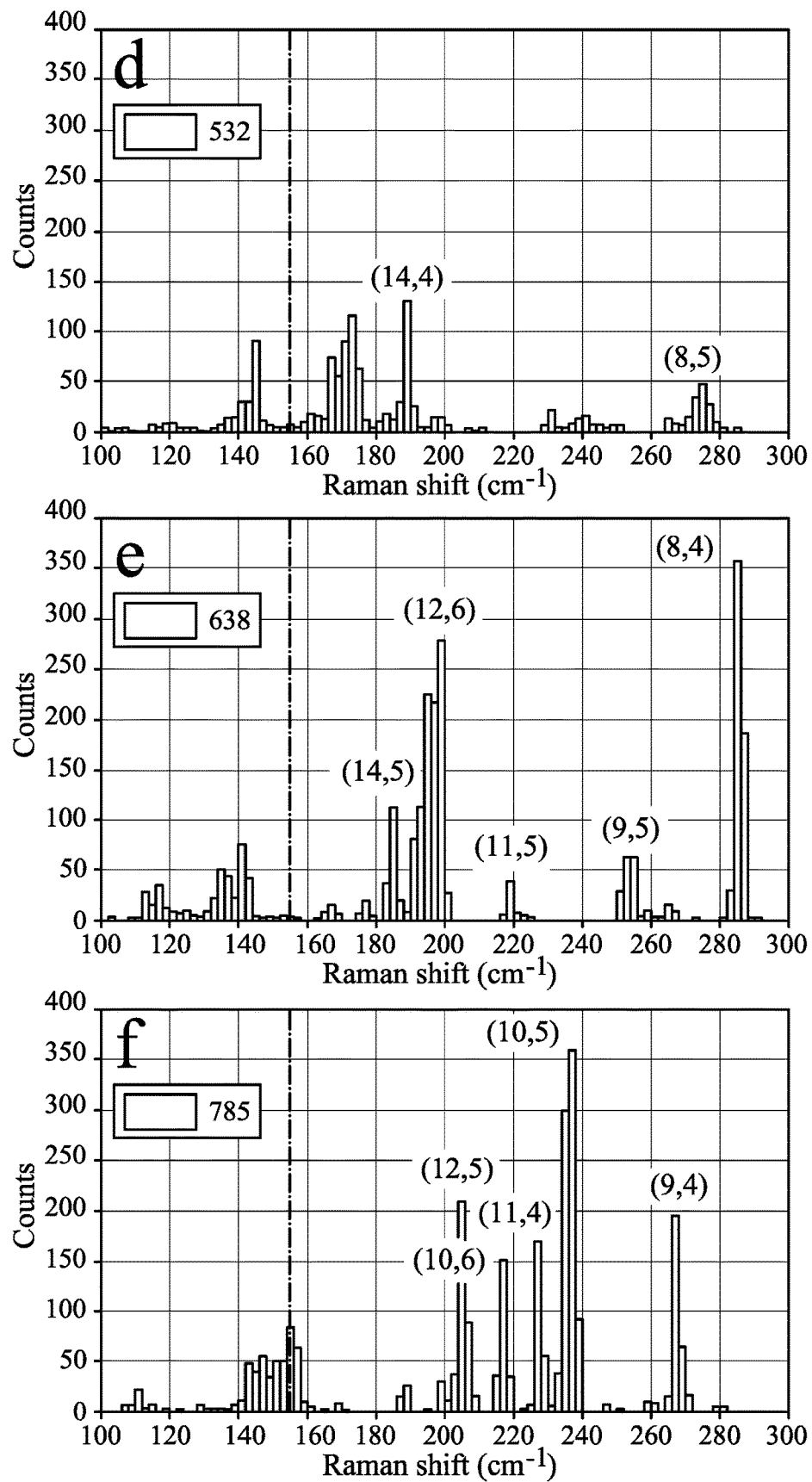
Figure 4:
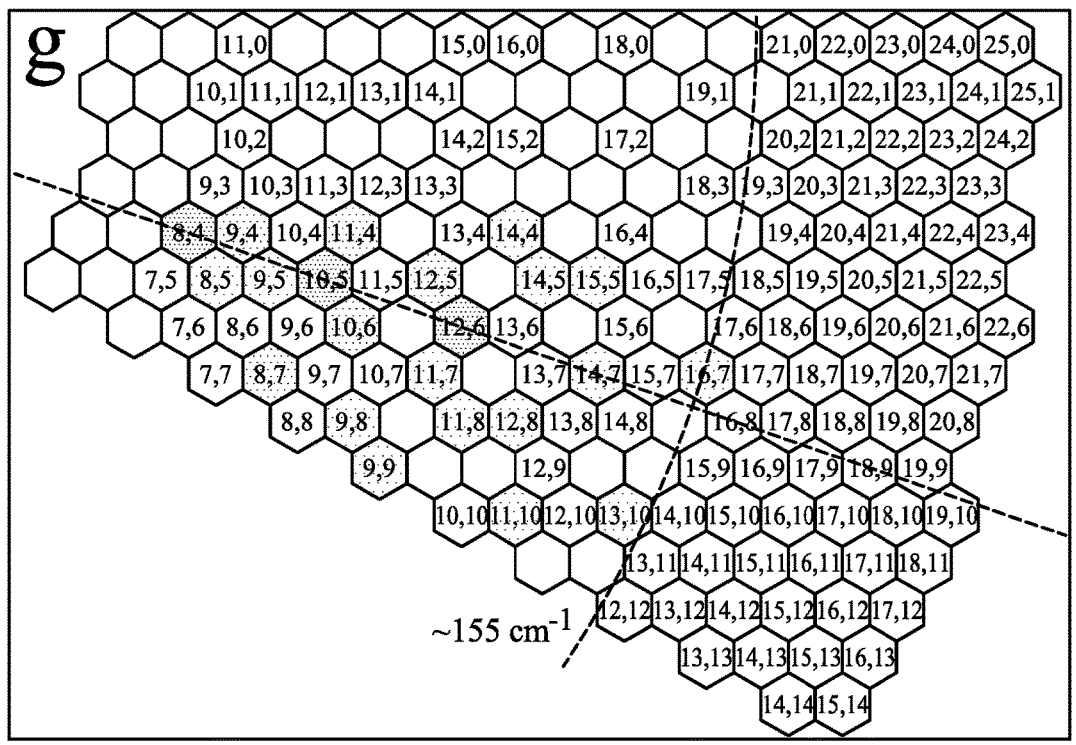
Figure 4:
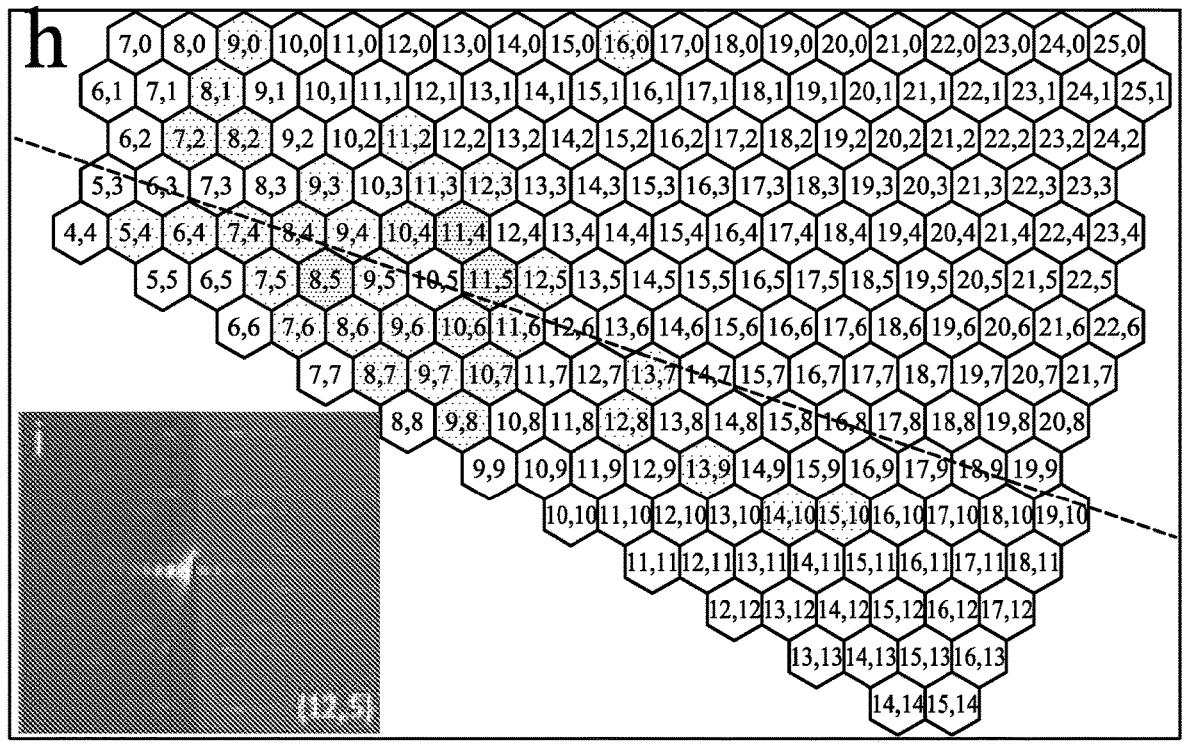

The chirality distributions or abundances of SWCNTs were mainly characterized through Raman RBM (radial breathing modes) mapping on the randomly distributed SWCNTs grown on a marked substrate such as that shown in FIG. 3a. As a high efficiency, low cost and non-destructive characterization method, resonant Raman (RR) spectroscopy is still the indispensable characterization method for chirality identification of SWCNTs, especially for large area statistics of SWCNTs grown on substrates. With 532, 638 and 785 nm lasers, SWCNTs with different chiralities gave excitation responses corresponding to those found in the Kataura plot (with corresponding rectification of the environmental factors) and show diameter dependent RBM peaks. With Raman xy-2D mapping, the laser spot rasterscanned the surface and a spectrum were obtained for each pixel. This accounts for the abundance of SWCNTs both with respect to the number of tubes and length of each tube ie mass abundance. The mass abundance is reflected more by the occurrence frequency of corresponding peak than the RBM peak height. Peaks were extracted from each pixel of the map and are cumulatively presented in FIG. 4a-c. The statistical abundance of each peak was obtained from each sample with the three exciting laser wavelengths (FIG. 4d-f) and was summarized on a graphene map (FIG. 4g).

In the Kataura plot (see FIG. 6), the chiralities with diameter >1.57 nm (RBM peaks ~155 $cm^{-1}$) are too densely located to unambiguously identify the chirality indices. To guarantee an unambiguous identification, graphene map painting was done only for diameters <1.57 nm (RBM peak ~155 $cm^{-1}$ represented by the blue DashDot line in FIG. 4a-g) but with abundance values based on all possible SWCNTs. For chiralities that cannot resonate with the 532, 638, and 785 nm laser, the honeycomb cells are left empty. Chiralities near (2n, n) were likely enriched and few can be found near the zigzag region.

Nanobeam electron diffraction (ED) was also used to determine the chirality of CNTs and the results are summarised in the graphene map shown in FIG. 4h. Though inefficient, ED is still the best method to recognize unambiguously the (n, m) chiral indices of all possible tubes. The ED pattern (FIG. 4i) was obtained from suspended CNTs occasionally stretching out from substrates. Due to this method, the abundance deviates from the mass abundance to the abundance of tube amount and there is a lack of information on tube length. However the technique gives more clues about tube nucleation condition and the preferred chiralities near (2n,n) can still be seen.

From FIG. 4g for W (oNP diameter ~2.5 nm, mNP diameter ~1.5 nm), the most enriched chiralities visible are (12, 6), (10, 5), (8, 4), (12, 5) and (9, 4) which locate around (2n, n) with a chiral angle near 19.1°. The highest mass abundance of (12, 6), (10, 5) and (8, 4) reached ~30%, ~20% and ~15% among thin SWCNTs (0.81-1.52 nm—the range in which unambiguous identification is possible) and ~20%, ~15% and ~10% in the range 0.81-2 nm. All visible (2n, n), (2n±1, n) and (2n±2, n) chiralities reached nearly 90% among thin SWCNTs. In contrast around the near zigzag or armchair region, few chiralities were identified. Only (8, 7) and (11, 10) have a medium abundance, if the abundance was not over-estimated because of the adjacent chirality (10, 5) and (13, 8), (15, 5) and (14, 7) respectively (see the rectified Kataura plot shown in FIG. 6). For all visible (2n, n), (2n±1, n) and (2n±2, n) chiralities (each compared with tubes of the similar diameter) only (10, 4), (11, 5) are less enriched. Considering both (10, 4) and (11, 5) can be seen in the ED results with an enriched abundance and the $E_{11}^L$ of (10, 4) and (11, 5) locates near the edge of the 0.1 eV resonance window of the 532 or 638 nm laser, the small abundance still seems to originate from a bad resonant condition. $E_{11}^H$ of (11, 5) also seems to resonate badly with the 532 nm laser.

As for the ED results, a concentrated distribution with a diameter less than 1.3 nm can also be seen which explains the smaller abundance of (13, 6), (14, 7) and (16, 7) in FIGS. 4d-f compared with (12, 6), (10, 5) and (8, 4). As mentioned above, ED reveals information on tube amount and therefore of the tube nucleation conditions. Based on the results, tubes with chiral angle 19±5° are still enriched. Whilst some zigzag tubes appear, no armchair tubes are identified. The appearance of zigzag tubes is attributable to enrichment during nucleation. The broader chirality distribution from ED compared with Raman RBM mapping can be explained by the recent reported A|Z segregation on the interface of a solid catalyst-tube which largely reduces the interface energy for all chiral tubes thereby broadening the equilibrium CNT nucleation probability distribution.

Compared with WC, $Mo_2C$ and Re showed a similar trend to produce more near (2n, n) chiralities (FIGS. 11e-1) but also exhibit some distinctive chirality preferences. Compared with WC, $Mo_2C$ produced a medium abundance of (8, 5), (9, 6), (14, 4) and (13, 4) whilst producing less (7, 6), (10, 6) and (8, 4). For Re, there was more (9, 4), (11, 4) and (12, 5) but less (8, 5). The solid state catalyst and similar CVD parameters resulted in the products being enriched with more near (2n, n) tubes. However the difference in tube-catalyst interface energy and the consequential nucleation and growth difference leads to slight differences between these catalysts. Indeed this work represents the first-time chirality-controlled SWCNTs have been grown from Re which uniquely remains elemental and solid state after growth.

As mentioned above, the point groups of WC, $Mo_2C$ and Re are different with a corresponding symmetry of 3, 2 and 6-fold respectively. However based on the statistics of the experimental results, WC, $Mo_2C$ and Re produce more SWCNTs near (2n, n) and the most rarely detected chiralities are always located towards the zigzag (ZZ) and armchair (AC) region in the graphene map (W in FIG. 4 and Mo and Re in FIG. 11). (12, 6) and (10, 5) SWCNTs with 6-fold and 5-fold symmetry are abundant for all 3 catalysts. The symmetry of the catalyst seems to have a limited influence on the SWCNT chirality abundance.

In addition to the requirement of a solid catalyst for chirality selection, the carbon to hydrogen ratio is also seen to be important. With excess carbon supply (C:H>1:15), the chirality selection is more apparent with (12, 6) and (10, 5) always dominant and all chiralities located near the (2n, n) line. In contrast when C/H<1:5 (see FIG. 12), chirality control is less apparent. Many other chiralities are observed in an abundance comparable with those near the (2n, n) line.

Based on the growth results, the best chirality control can only be reached when the catalyst size is sufficiently small usually with an oNP diameter <3 nm. Larger diameter catalysts produced more tubes with larger diameter which results in more chiralities. Moreover tangential growth is dominant and the highly positive correlation between catalyst and SWCNT diameters has also been verified by HRTEM (see FIGS. 3 and 13). By remaining solid during growth, catalysts retain a fixed diameter which is vital for realization of chirality control.

Furthermore unlike Fe, Co and Ni catalysts, the solid W, Re and Mo catalysts have a relatively low oxidization temperature in air which permits their easy removal after CVD to leaving pure CNTs on target substrates.

Qualitative Modelling

Without a symmetry matching mechanism to understand the preferential chirality distribution which was observed, the following factors were studied: tube-catalyst interfacial thermodynamics during nucleation, the growth kinetics and the self-developed chirality-dependent growth time.

As reported in Artyukhov [supra], the mass-based abundance of the (n, m) SWCNT at time t is given by the integral:

$$A(t,n,m)=\int_0^t p(\tau,n,m)v(\tau,n,m)d\tau \quad (2)$$

where p(τ, n, m) and v(τ, n, m) are the cumulative probability and growth rate respectively of a catalyst growing a (n, m) SWCNT at time T. Based on an assumption that the growth time was chirality-independent, all time terms were separated from chirality-dependent terms (n, m) in Eq. 2 as follows:

$$A(t,n,m)=N(n,m)R(n,m)S(t) \quad (3)$$

where N(n, m) is the nucleation probability of a (n, m) SWCNT from a catalyst, R(n, m) is the growth rate of a (n,m) SWCNT and S(t) is the assembly of all time-terms.

However Eq. 3 is only valid when catalyst inactivation is independent of chirality or when catalysts are always active and the length of a CNT would therefore only be constrained by growth speed. However after CNT synthesis, inactive catalysts are always observed along with relatively short CNTs (see FIG. 13). The inactivation of a catalyst may originate from the ever-increasing surface carbon not being delivered efficiently to feed the growth of a SWCNT. As shown in FIGS. 3e and f, the catalysts were always wrapped by a carbon cap resulting in the "pea pod" morphology. This phenomenon could be more evident when an inefficient solid catalyst is used rather than an efficient liquid catalyst like iron.

Furthermore differences in growth kinetics could lead to inactivation of the catalyst as a function of chirality. Only chiralities with sufficient growth speed would be able to incorporate the incoming carbon towards CNT growth rather than surface accumulation and catalyst poisoning. Thus in addition to a faster growth speed, these chiralities would also be able to prolong their growth time before being halted from catalyst poisoning. If the growth rate of a particular chirality is sufficiently fast, the carbon supply rate would be the limiting factor towards CNT growth rate and CNT length. In summary, the chirality-dependent growth time difference factor should be distinguished from the growth kinetics factor.

Here phenomenologically involved was the trapping rate, $R_{trap}$ which is proportional to the rate of incident carbon onto the catalyst to either feed CNT growth or obstruct it. Another parameter is the carbon tolerance capability of the catalyst, U(d). With the knowledge that the catalysts are solid during growth and that the carbon surface diffusion is the dominant growth mode rather than bulk diffusion, it was assumed that U(d) is proportional to the catalyst surface area. Then the abundance of the (n,m) SWCNT at time t could be revised to:

$$A(t,n,m)=N(n,m)V(n,m,t) \quad (4)$$

here V(n, m, t) is the growth rate term and accounts for the chirality-dependent growth time where $$V(n, m, t) = \begin{cases} R_{trap} \times t, & \text{when } R(n, m) > R_{trap} & (5.1) \\ R(n, m) \times t, & \text{when } R(n, m) < R_{trap} \text{ and } t < \dfrac{U(d)}{R_{trap} - R(n, m)} & (5.2) \\ R(n, m) \times \dfrac{U(d)}{R_{trap} - R(n, m)}, & \text{when } R(n, m) < R_{trap} \text{ and } t > \dfrac{U(d)}{R_{trap} - R(n, m)} & (5.3) \end{cases}$$

where t is the set growth time during the experiment. Moreover when t is long enough, occasionally randomly ending of CNTs growth because of defects formation etc will form the upper boundary for t.

V(n, m, t) concludes the growth is constrained by any of the following: the carbon supply (Eq. 5.1), growth time (Eq. 5.2) or catalyst carbon tolerance (Eq. 5.3).

Additional modelling details relating to calculation on abundance are provided in the Appendix below.

When the C:H ratio is low, SWCNTs growth could be constrained by the carbon supply (Eq. 5.1) (except zigzag and armchair SWCNTs for which the growth rate is too slow). In this case any differences in nucleation preference would dominate the resulting chirality distribution. For solid catalysts, the thermodynamic preference is mainly determined by the value difference of different catalyst-tube interface energy ($E_{Int}^Z$, $E_{Int}^A$). As mentioned above, the newly reported A|Z segregation on the interface largely reduces the interface energy for all chiral tubes, broadening the equilibrium CNT nucleation probability distribution. The growth will be ended by set time or randomly ended by defects.

In contrast, when the growth environment is enriched with carbon, the SWCNTs with low growth rates would lead the catalyst to be poisoned much earlier leaving only the fast growing chiralities to continue growing and resulting in a higher mass-based abundance of these fast-growing chiralities in the product. On solid catalysts, the growth rate is bimodal with minima at the AC and ZZ ends and a maximum at the 19.1° line of (2n, n) SWCNTs (see FIG. 14e). Consequently the abundance distribution would prefer (2n, n), (2n±1, n), and (2n±2, n) chiralities (see FIG. 14h) and this confirms the experimental abundance results.

Besides nucleation thermodynamics, growth kinetics and chirality-dependent growth time, the size of catalyst determines directly the region of possible chiralities thereby affecting final chirality abundance (compared FIG. 14f-g with h-i)

Growth from liquid catalysts has also been modelled and is presented in FIGS. 14a-c. Using the same set of modelling parameters, AC and near AC SWCNTs are preferred mainly due to the proportional growth rate with chirality angle. However from Ostwald ripening, liquid catalysts tend to possess a much broader size distribution than solid catalysts leading to a correspondingly broad distribution of SWCNT diameters and chiralities. With a very low energy barrier, the nucleation of SWCNTs from liquid catalysts would also be indiscriminate.

CONCLUSIONS

Figure 5:
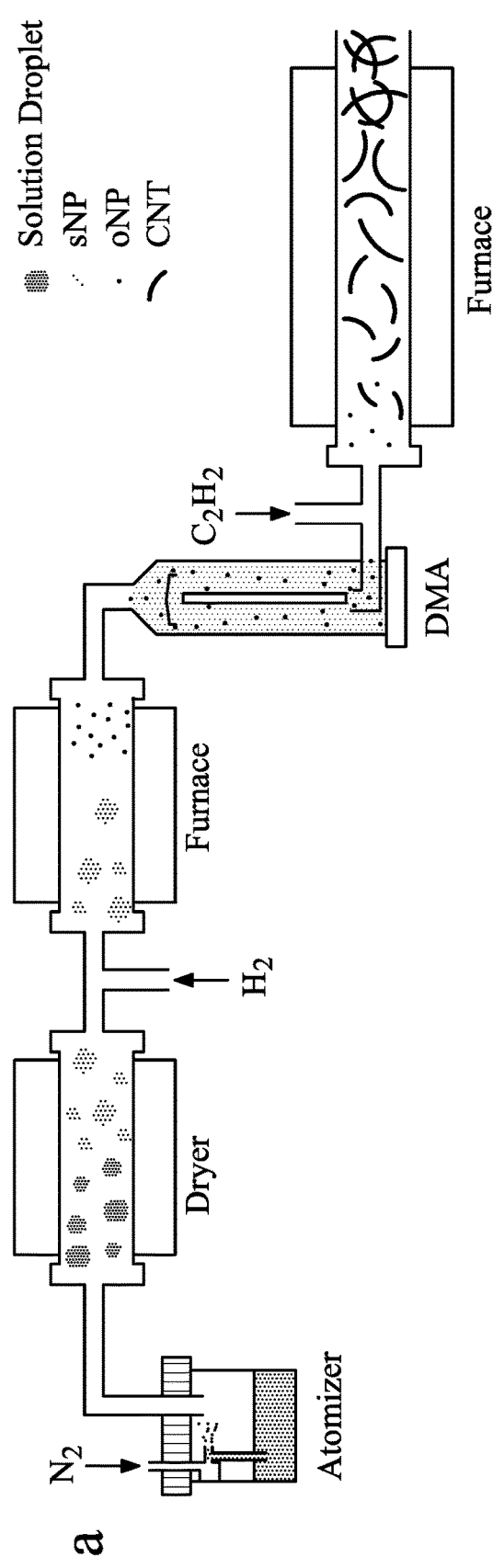
FIG. 5 is a schematic diagram of a floating catalyst CVD (FCCVD) setup and the corresponding preliminary results of CNTs grown from FCCVD without size selection.
Figure 5:
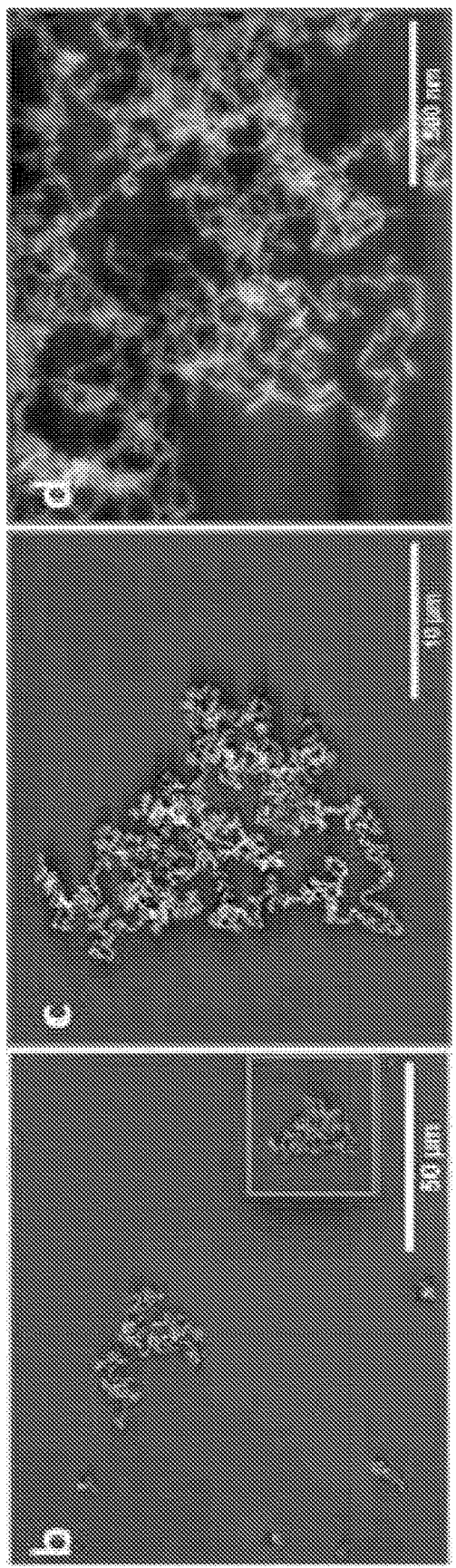

Due to the gas-phase nature of the catalyst formation process, the particles have no dependence on substrate. The substrate can therefore be eliminated entirely to achieve a fully continuous process. By bringing in hydrogen and a carbon source in a gas line, continuous floating catalyst CVD (FCCVD) growth from the solid catalyst was achieved for the first time (see FIG. 5). FIGS. 5b and c show some preliminary product from FCCVD with W solid catalyst. To increase the CNT production rate, FCCVD growth was carried out with a large catalyst (oNPs>5 nm) without fine size selection. The relative low efficiency of the solid catalyst, the sensitivity of refractory metal oxide to the reduction process and the lack of carbon transfer from substrate to catalyst was more of a challenge than a traditional liquid catalyst.

With an aerosol-based size selection method, a highly scalable method for production of nearly monodisperse W, Mo and Re oxide nanoparticles with a diameter less than 2 nm was achieved. These nanoparticles were reduced to form a solid catalyst which was capable of producing well-controlled CNT diameter and chirality distributions. Despite the well-known symmetry matching and epitaxy growth, the chirality control mechanism was attributed to differences not only in growth rate between chiralities but also the extended growth time available for fast-growing CNTs. With a high carbon growth environment, the three metals generated similar near (2n, n) chirality SWCNTs with a particularly high abundance of (12, 6) and (10, 5). Chiralities with chirality angle 19±5° were particularly prevalent with their abundance reaching over 90%. By virtue of the aerosol method of producing precisely-sized NPs, continuous production of chirality controlled SWCNTs is achievable and may help increase the impact of this remarkable material in many fields of science and engineering.

APPENDIX

As reported in Artyukhov [supra], at time t, the abundance of the (n, m) SWCNT is given by the integral:

$$A(t,n,m) = \int_0^t p(\tau,n,m) v(\tau,n,m) d\tau \quad \text{(Eq. 2)}$$

where p(t, n, m) and v(t, n, m) are the cumulative probability and growth rate for this catalyst to grow a (n, m) SWCNT at time t.

As mentioned above, if the chirality-dependent growth time difference factor is considered, the abundance of the (n, m) SWCNT at time t is revised to:

$$A(t,n,m) = N(n,m) V(n,m,t) \quad \text{(Eq. 4)}$$

here N(n, m) is the nucleation probability of a (n, m) SWCNT from a catalyst, V(n, m, t) is the growth rate term and accounts for the chirality-dependent growth time where $$V(n, m, t) = \begin{cases} R_{trap} \times t, & \text{when } R(n, m) > R_{trap} & \text{(Eq. 5.1)} \\ R(n, m) \times t, & \text{when } R(n, m) < R_{trap} \text{ and } t < \dfrac{U(d)}{R_{trap} - R(n, m)} & \text{(Eq. 5.2)} \\ R(n, m) \times \dfrac{U(d)}{R_{trap} - R(n, m)}, & \text{when } R(n, m) < R_{trap} \text{ and } t > \dfrac{U(d)}{R_{trap} - R(n, m)} & \text{(Eq. 5.3)} \end{cases}$$

where t is the set growth time during experiment. V(n, m, t) concludes the growth is constrained by any of the following: the carbon supply (Eq. 5.1), growth time (Eq. 5.2) or catalyst carbon tolerance (Eq. 5.3). $R_{trap}$ is the trapping rate which is proportional to the rate of incident carbon onto the catalyst. U(d) is the catalyst's carbon tolerance capability, d is the SWCNT diameter. R(n,m) is the growth rate of a (n, m) SWCNT.

As reported in Artyukhov [supra], the thermodynamic model during nucleation is as follows:

$$N(n, m) \propto \exp\left(-\frac{\Gamma_{n,m} + G_{n,m}^{cap}}{k_B T}\right) \quad \text{(S11)}$$

where $\Gamma_{n,m}$ is the contact interface energy between the CNT edge and the catalyst and $G_{n,m}^{cap}$ is the cap free energy.

$$\Gamma_{n,m} = 2mE_{Int}^{A} + (n-m)E_{Int}^{Z} + E_{Curv}^{(n,m)} \quad \text{(S12)}$$

Here $E_{Int}^{A,Z}$ is the CNT-catalyst interaction energy of the edge atoms of A or Z type.

$$E_{Curv}^{(n,m)} = E_{Curv}^{atom}(n + m) = \frac{2\alpha}{d^2} = \frac{2\alpha}{d^2}(n + m).$$

$\alpha = 0.039$ eV·nm²/atom is the bending rigidity of graphene, d is the diameter of a (n, m) SWCNT.

$$G_{n,m}^{cap} = E_{n,m}^{cap} - TS_{n,m}^{cap} = \text{const} - Tk_B \ln N_{n,m}^{cap} \quad \text{(S13)}$$

Here $E_{n,m}^{cap}$ is the elastic energy of the CNT cap which is constant for a hemispherical elastic shell. $S_{n,m}^{cap}$ and $N_{n,m}^{cap}$ is the cap entropy and the number of caps of (n, m) chirality SWCNTs respectively. $k_B$ is the Boltzmann constant.

On the CNT-solid catalyst interface, the restructured asymmetric CNT edge (segregated A|Z-edge) and chirality-dependent defects formation were reported from theoretical modelling. The former result illustrated preferential nucleation of tubes with 2m<n but much faster growth of chiral tubes with n≤2m which greatly released the unfavoured nucleation of chiral SWCNTs. The latter result further clarified the (12, 6) A|Z-segregated interface to be least prone to defects formation and appears as an "transient attractor" in the chirality evolution trend from Z to A. Here because of the reported segregated A|Z-edge, only the cap entropy was considered instead of adding the entropy of interface configuration.

However because of a lack of kinetic Monte Carlo (kMC) simulations capability, the conventional circular edge interface was used which should lead to similar abundance with kMC results without chirality switching. The missed chirality switching from defects formation would even increase the abundance of (2n, n) tubes.

For solid catalysts, $E_{Int}^{A}$ of 0.147 eV/atom and $E_{Int}^{Z}$ of 0.144 eV/atom were used following the reported value from a $Co_7W_6$ solid catalyst on a W slab. For liquid catalysts, $E_{Int}^{A}$ of 0.09 eV/atom and $E_{Int}^{Z}$ of 0.345 eV/atom were used as reported for the Co (111) catalyst with segregated A|Z interface. As shown in FIG. 14a for liquid catalysts with the given $E_{Int}^{A,Z}$ value, nucleation thermodynamics will lead to concentrated chiralities with large chiral angle. As to solid catalysts with the given $E_{Int}^{A,Z}$ values, nucleation tends to prefer a smaller chiral angle but with broader distribution (see FIG. 14d).

As to the growth kinetics, because of the lack of kinetic Monte Carlo (kMC) simulations capability the conventional circular edge interface was used and the growth rate R(n, m) is as follows:

$$R(n, m) \propto \pi d(n, m) \exp\left(-\frac{E_{Curv}^{atom}}{k_B T}\right)\left[x(n, m) + \exp\left(-\frac{G(n, m, T)}{d(n, m)k_B T}\right)\right] \quad \text{(S14)}$$

$$\text{And } x(n, m) = \begin{cases} \chi(n, m), & \text{for near } ZZ \text{ type} \\ 30° - \chi(n, m), & \text{for near } AC \text{ type} \end{cases}$$

For liquid catalysts based on screw dislocation theory, the cost $E_{Int}^{A}$ to create a pair of kinks on an A edge is nearly zero and consequently SWCNTs growth rate is proportional to chiral angle (see FIG. 14b). For the combination of the results of nucleation thermodynamics and growth kinetics, the preferred region is around armchair chiralities (see FIG. 14c). The abundance was determined mainly by growth kinetics and resulting in wider distributed chiralities with large chiral angle.

However on a solid surface, creating a pair of kinks destroys the perfect contact between the CNT and substrate, $E_{Int}^{A}$ and $E_{Int}^{Z}$ all have noticeable magnitude and the dependence becomes bimodal with minima at the A and Z ends and a maximum at 19.1° (see FIG. 14e). The combined effect on abundance prefers (n, 1) and (n, 2) chiralities (see FIG. 14f).

With catalyst size selection, the abundance distribution shifts because of the guidance effect from catalysts (see FIG. 14g). Moreover when the catalyst is too large, the resultant CNTs will contain more few-walled CNTs which ruins the chirality control.

With a carbon rich environment, the chirality-dependent growth time factor was deployed. A threshold was set in FIG. 14e. In the example with the given $E_{Int}^{A,Z}$ values, if ~½ of chiralities is set in the range 0.65-2 nm to be constrained, the abundance distribution shifts towards 19.1° and predominantly enriched (12, 6) (see FIG. 14h).

With an even narrower distribution and thinner size of catalysts (0.8±0.2 nm) and a proper limitation on growth time of part slow growing SWCNTs, the semiconducting chiralities such as (8, 4), (10, 3), (9, 4), (11, 3) are predicted to be enriched (see FIG. 14i).

The invention claimed is:
1. A method for the production of a carbon material comprising SWCNTs, wherein the method comprises:
(a) producing a flow of a refractory metal material suspended in a carrier gas;

(b) introducing the flow of the refractory metal material into a temperature-controlled flow-through furnace;

(c) subjecting the flow of the refractory metal material to a temperature sufficient to generate a flow of a refractory metal substance, wherein the flow of the refractory metal substance is exposed to a first temperature zone sufficient to evaporate the refractory metal substance and to a second temperature zone downstream from the first temperature zone, wherein the second temperature zone is sufficient to re-nucleate the refractory metal substance to generate a flow of a nanoparticulate refractory metal substance;

(d) isolating from the flow of the nanoparticulate refractory metal substance a discrete flow of the nanoparticulate refractory metal substance which exhibits a selected distribution of nanoparticle size;

(e) introducing the discrete flow of the nanoparticulate refractory metal substance into a temperature-controlled reactor;

(f) optionally releasing a flow of a reducing agent into the temperature-controlled reactor, wherein the flow of the reducing agent and the discrete flow of the nanoparticulate refractory metal substance are exposed to a third temperature zone sufficient to generate a flow of a nanoparticulate refractory metal;

(g) releasing a flow of a source of carbon into the temperature-controlled reactor; and (h) exposing the nanoparticulate refractory metal and the source of carbon to a fourth temperature zone sufficient to produce the carbon material comprising SWCNTs which is adaptable into a supported or self-supporting form in or collectable from the temperature-controlled reactor.

2. A method as claimed in claim 1 wherein the refractory metal is W, Mo or Re.

3. A method as claimed in claim 1 wherein step (d) is carried out by classifying the nanoparticles of the nanoparticulate refractory metal substance according to their mass, aerodynamic diameter or electrical mobility.

4. A method as claimed in claim 1 wherein the geometric mean diameter (GMD) of the nanoparticulate refractory metal substance in the discrete flow of the nanoparticulate refractory metal substance is 3 nm or less.

5. A method as claimed in claim 1 wherein the number concentration of the nanoparticulate refractory metal substance in the discrete flow of the nanoparticulate refractory metal substance is $10^7$ cm$^{-3}$ or more.

6. A method as claimed in claim 1 wherein the geometric mean diameter (GMD) of the nanoparticulate refractory metal is 2 nm or less.

7. A method as claimed in claim 1 wherein the nanoparticulate refractory metal substance in the discrete flow of the nanoparticulate refractory metal substance is substantially monodispersed.

8. A method as claimed in claim 1 wherein the geometric standard deviation (GSD) of the diameter of the nanoparticulate refractory metal substance is less than 1.1.

9. A method as claimed in claim 1 further comprising: introducing a discrete flow of a second nanoparticulate refractory metal substance into the temperature-controlled reactor.

10. A process for the production of a carbon material comprising SWCNTs, wherein the process comprises:

(1) producing a flow of a refractory metal material suspended in a carrier gas;

(2) introducing the flow of the refractory metal material into a temperature-controlled flow-through furnace;

(3) subjecting the flow of the refractory metal material to a temperature sufficient to generate a flow of a refractory metal substance, wherein the flow of the refractory metal substance is exposed to a first temperature zone sufficient to evaporate the refractory metal substance and to a second temperature zone downstream from the first temperature zone, wherein the second temperature zone is sufficient to re-nucleate the refractory metal substance to generate a flow of a nanoparticulate refractory metal substance;

(4) isolating from the flow of the nanoparticulate refractory metal substance a discrete flow of the nanoparticulate refractory metal substance which exhibits a selected distribution of nanoparticle size;

(5) exposing an optional reducing agent and the nanoparticulate refractory metal substance to a third temperature zone sufficient to generate a nanoparticulate refractory metal; and (6) exposing a source of carbon and the nanoparticulate refractory metal to a fourth temperature zone sufficient to produce the carbon material comprising SWCNTs, wherein the process further comprises either depositing the nanoparticulate refractory metal substance onto a substrate after step (4) or depositing the nanoparticulate refractory metal onto a substrate after step (5).

11. An apparatus for the production of a carbon material comprising SWCNTs, wherein the apparatus comprises:

(A) an aerosolising device for producing an aerosol flow of a refractory metal material suspended in a carrier gas;

(B) a temperature-controlled flow-through furnace operatively connected to and downstream from the aerosolising device, wherein in use the temperature-controlled flow-through furnace receives the flow of the refractory metal material and discharges a flow of a nanoparticulate refractory metal substance;

(C) a particle size classifier operatively connected to and downstream from the temperature-controlled flow-through furnace, wherein in use the particle size classifier isolates a discrete flow of the nanoparticulate refractory metal substance according to a selected distribution of particle size;

(D) a first device for exposing an optional reducing agent and the nanoparticulate refractory metal substance to a temperature sufficient to generate a nanoparticulate refractory metal; and (E) a second device for exposing a source of carbon and the nanoparticulate refractory metal to a temperature sufficient to produce the carbon material comprising SWCNTs, wherein the apparatus further comprises: a precipitator operatively connected to and downstream from the first device, wherein in use the precipitator deposits the nanoparticulate refractory metal onto a substrate.

* * * * *